United States Patent
Hedayatnia et al.

(10) Patent No.: US 12,512,096 B2
(45) Date of Patent: Dec. 30, 2025

(54) SPEECH RECOGNITION USING DIALOG HISTORY

(71) Applicant: Amazon Technologies, Inc., Seattle, WA (US)

(72) Inventors: Behnam Hedayatnia, San Francisco, CA (US); Anirudh Raju, San Jose, CA (US); Ankur Gandhe, Bothell, WA (US); Chandra Prakash Khatri, San Jose, CA (US); Ariya Rastrow, Seattle, WA (US); Anushree Venkatesh, San Mateo, CA (US); Arindam Mandal, Redwood City, CA (US); Raefer Christopher Gabriel, San Jose, CA (US); Ahmad Shikib Mehri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/340,378

(22) Filed: Jun. 7, 2021

(65) Prior Publication Data
US 2021/0312914 A1 Oct. 7, 2021

Related U.S. Application Data

(63) Continuation of application No. 16/204,670, filed on Nov. 29, 2018, now Pat. No. 11,043,214.

(51) Int. Cl.
*G10L 15/19* (2013.01)
*G10L 15/22* (2006.01)
*G10L 15/30* (2013.01)
*G10L 19/00* (2013.01)

(52) U.S. Cl.
CPC ............... *G10L 15/19* (2013.01); *G10L 15/22* (2013.01); *G10L 15/30* (2013.01); *G10L 19/00* (2013.01)

(58) Field of Classification Search
CPC .... G06F 3/167; G06F 17/30867; G06F 15/30; G10L 25/78; G10L 15/22; G10L 15/197
See application file for complete search history.

(56) References Cited

U.S. PATENT DOCUMENTS

| | | | |
|---|---|---|---|
| 9,691,384 B1 * | 6/2017 | Wang | G10L 15/18 |
| 10,789,943 B1 * | 9/2020 | Lapshina | G10L 15/1815 |
| 10,860,629 B1 * | 12/2020 | Gangadharaiah | G06F 16/3329 |
| 11,043,230 B1 * | 6/2021 | Riding | G06Q 30/0269 |
| 11,056,107 B2 * | 7/2021 | Nahamoo | G10L 15/22 |
| 2012/0084086 A1 * | 4/2012 | Gilbert | G10L 15/26 704/235 |
| 2014/0358537 A1 * | 12/2014 | Gilbert | G10L 15/063 704/235 |
| 2016/0055240 A1 * | 2/2016 | Tur | G06F 16/951 707/706 |
| 2016/0104478 A1 * | 4/2016 | Seo | G10L 15/08 704/244 |

(Continued)

*Primary Examiner* — Anne L Thomas-Homescu
(74) *Attorney, Agent, or Firm* — Pierce Atwood LLP

(57) ABSTRACT

Described herein is a system for rescoring automatic speech recognition hypotheses for conversational devices that have multi-turn dialogs with a user. The system leverages dialog context by incorporating data related to past user utterances and data related to the system generated response corresponding to the past user utterance. Incorporation of this data improves recognition of a particular user utterance within the dialog.

18 Claims, 27 Drawing Sheets

(56) References Cited

U.S. PATENT DOCUMENTS

| | | | | |
|---|---|---|---|---|
| 2016/0300573 | A1* | 10/2016 | Carbune | G10L 17/22 |
| 2017/0177716 | A1* | 6/2017 | Perez | G06F 40/35 |
| 2017/0213551 | A1* | 7/2017 | Ji | G10L 15/183 |
| 2018/0254035 | A1* | 9/2018 | Kulkarni | G10L 15/22 |
| 2018/0329957 | A1* | 11/2018 | Frazzingaro | G06F 16/24564 |
| 2019/0035385 | A1* | 1/2019 | Lawson | G10L 15/063 |
| 2019/0043527 | A1* | 2/2019 | Georges | G10L 15/005 |
| 2019/0115027 | A1* | 4/2019 | Shah | G10L 17/22 |
| 2019/0318724 | A1* | 10/2019 | Chao | G10L 15/22 |
| 2020/0152184 | A1* | 5/2020 | Steedman Henderson | G06F 40/35 |
| 2021/0350209 | A1* | 11/2021 | Wang | G06N 3/08 |

* cited by examiner

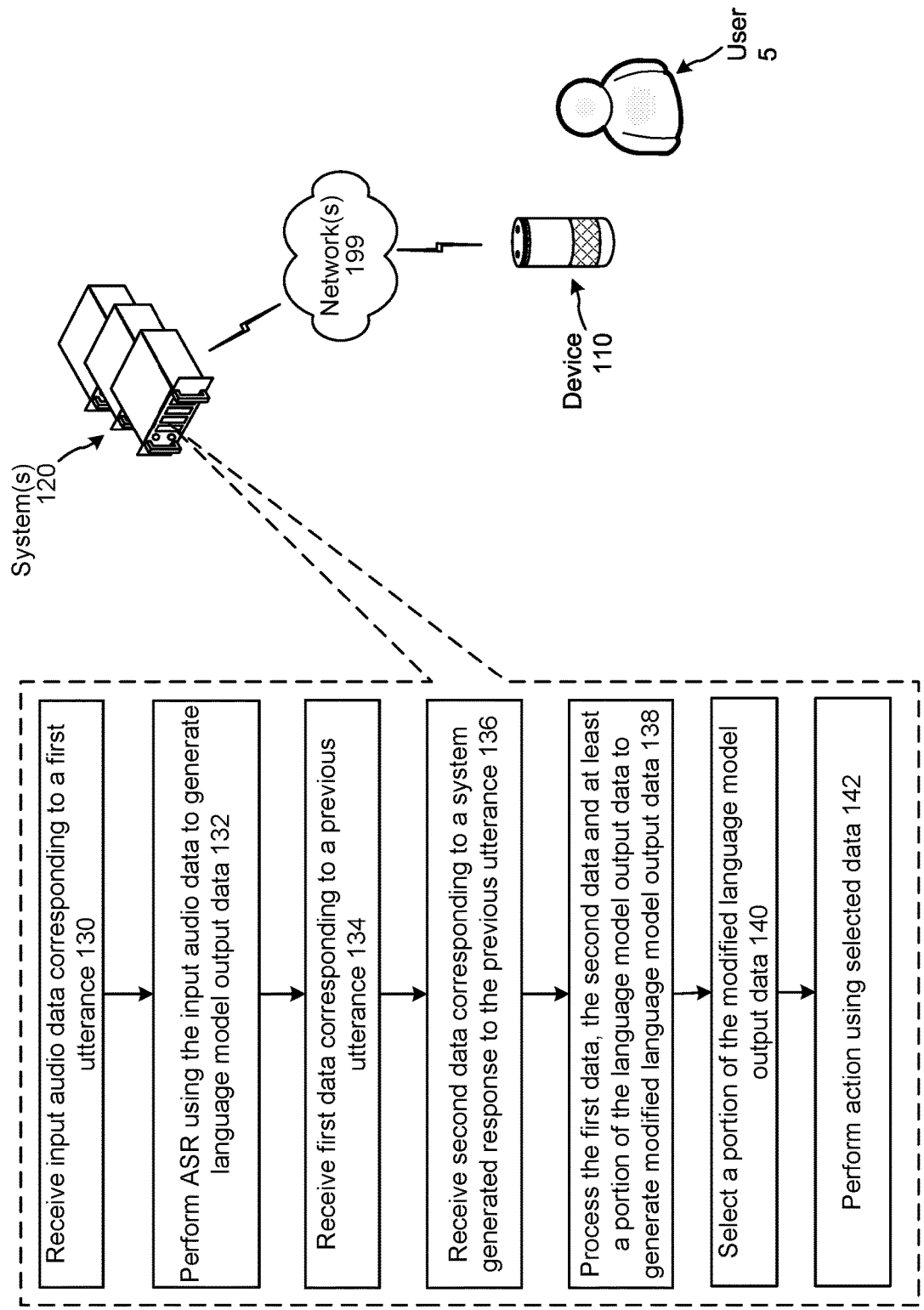

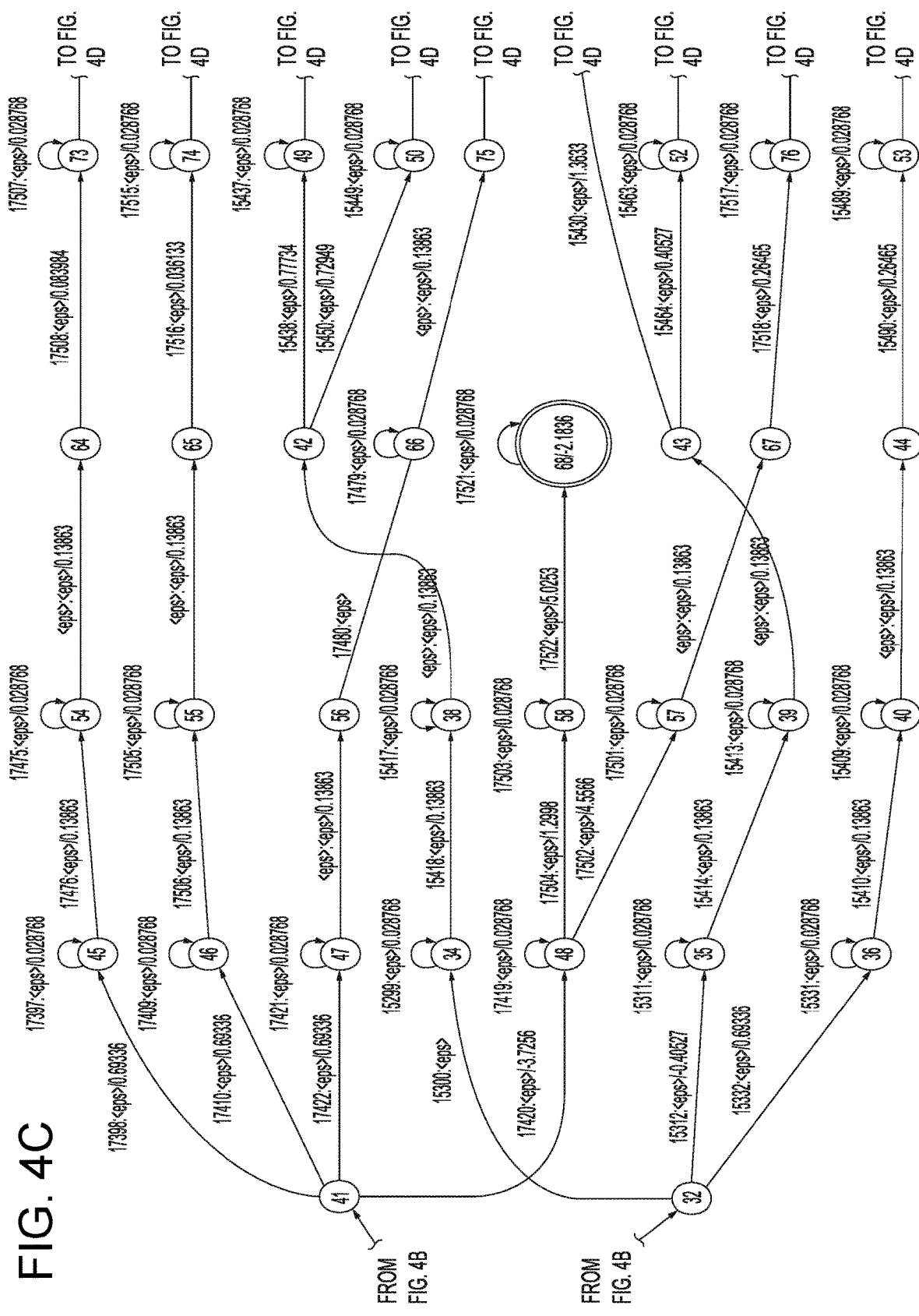

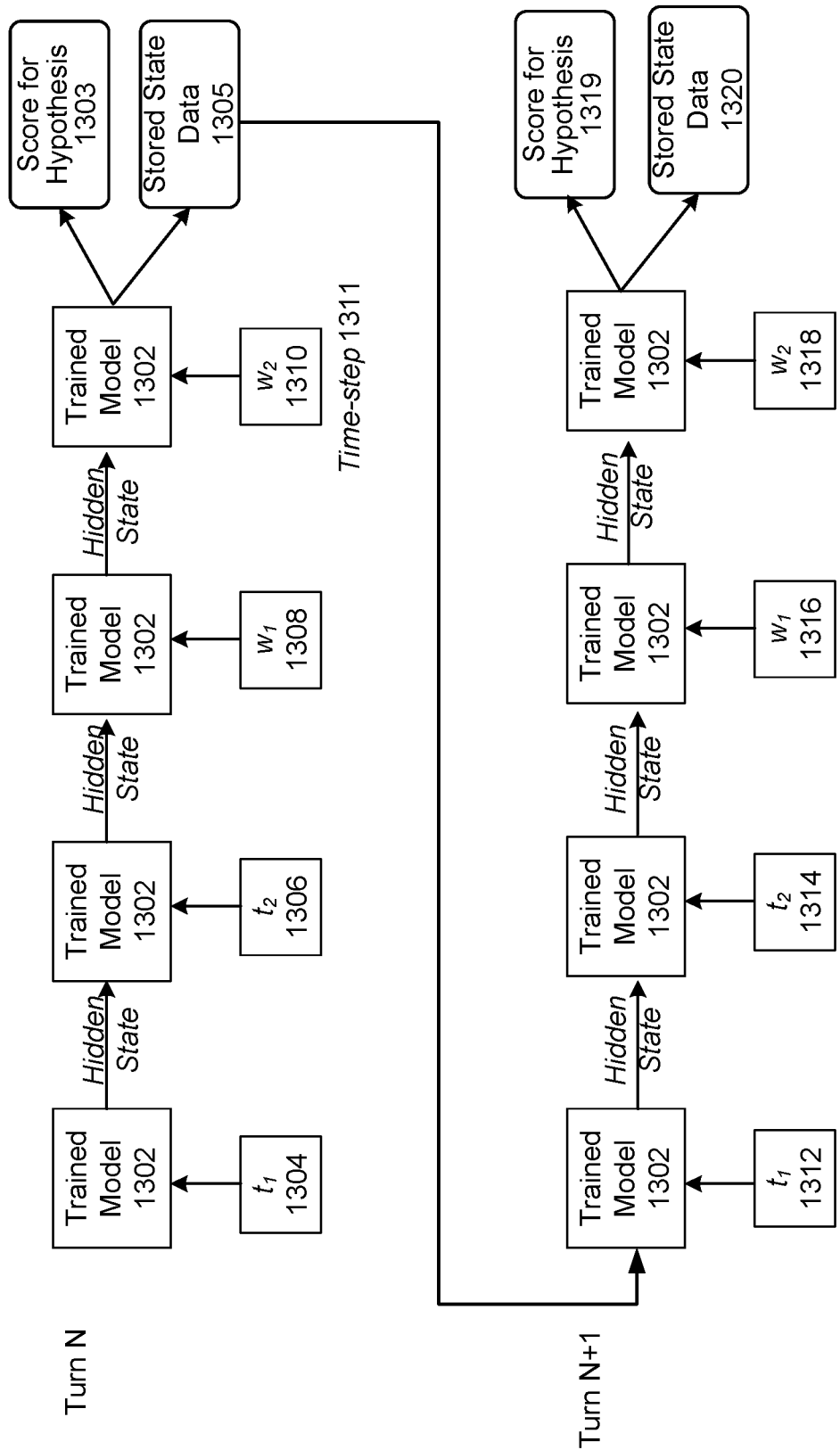

SPEECH RECOGNITION USING DIALOG HISTORY

CROSS-REFERENCE TO RELATED APPLICATION

This application is a continuation of, and claims the benefit of priority of, U.S. Non-Provisional patent application Ser. No. 16/204,670, filed Nov. 29, 2018, and entitled "SPEECH RECOGNITION USING DIALOG HISTORY," scheduled to issue as U.S. Pat. No. 11,043,214, the contents of which are expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech processing refers to the combination of speech recognition and natural language understanding processing techniques. Speech processing may also involve converting a user's speech into text data, which may then be provided to various text-based software applications.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to rescore language model output data using dialog history according to embodiments of the present disclosure.

FIGS. 4A-4D illustrate a section of a finite state transducer according to embodiments of the present disclosure.

FIGS. 13A and 13B are block diagrams conceptually illustrating a long short-term memory (LSTM) encoder context technique using the same encoder to encode both the user utterances and the system generated responses according to embodiments of the present disclosure.

DETAILED DESCRIPTION

Figure 2A:
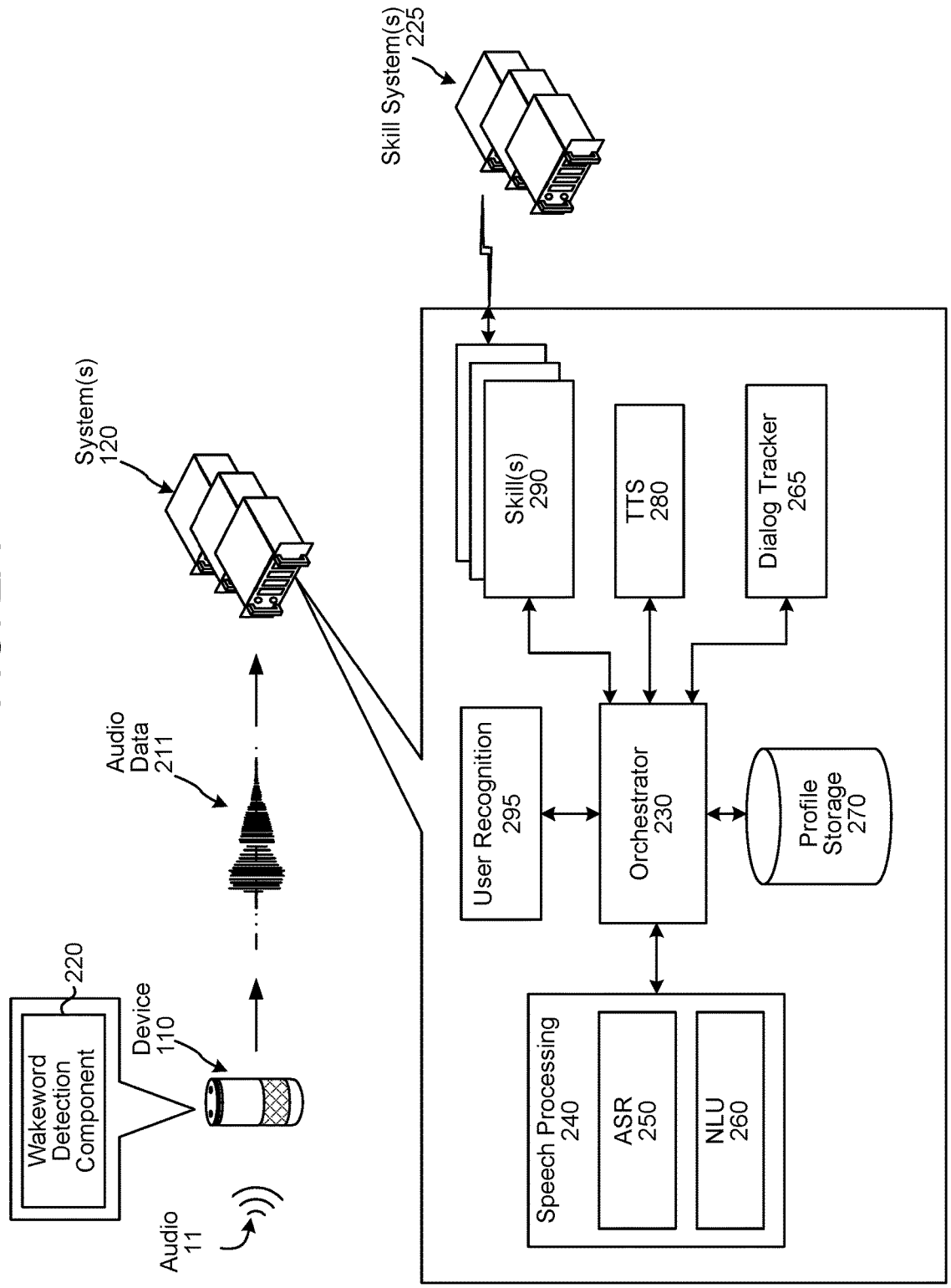
FIG. 2A is a conceptual diagram of speech processing components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may also be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the device response.

Systems configured to engage in dialogs with a user may use the dialog session identifier or other data to track the progress of the dialog to select system responses in a way that tracks the previous user-system exchanges, thus moving the dialog along in a manner that results in a desirable user experience.

Systems may incorporate information such as the dialog history (which may include user inputs, system responses, or other data relevant to the dialog) in the natural language understanding (NLU) operations when interpreting user inputs so the system can select an appropriate response to what the user said. Doing so, however, may not fully take advantage of the dialog context as it may be important to consider the dialog history not only in interpreting what a user meant by what he/she said, but also in interpreting what they actually said. Some ASR components may be configured to focus on input audio data rather than on contextual information.

Offered is a system that can incorporate dialog history not only in NLU operations that interpret what a user meant, but also in automatic speech recognition (ASR) operations that determine what a user said. For example, text from a previous user input and previous system response may be used to re-score, or otherwise re-order potential textual interpretations output by an ASR component (and in particular a language model). The text may be encoded using various techniques and processed using a component that is configured to select from potential ASR outputs in a way that considers the dialog history. Further details of such operations are explained below.

FIG. 1 illustrates a system configured to rescore language model output data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user 5 and one or more systems 120 connected across one or more networks 199. The processes described with respect to FIG. 1 may be performed during offline operations.

As shown in FIG. 1, system(s) 120 receive (130) input audio data corresponding to a first utterance. The first utterance may be spoken by the user 5 and captured by the device 110. User 5 and device 110 may be participating in a dialog session, where the user 5 may speak an utterance and the device 110 may generate a text-to-speech response to the utterance.

The system(s) 120 perform (132) automatic speech recognition (ASR) using the input audio data to generate language model output data including ASR hypotheses and corresponding scores. ASR may be performed on the input audio data as described in detail below. One of the outputs or results of ASR is language model output data. The language model output data may include one or more ASR hypotheses for the first utterance. Each ASR hypothesis has a score or probability associated with it. For example, the language model output data includes at least a first ASR hypothesis corresponding to a first score and a second ASR hypothesis corresponding to a second score.

The system(s) 120 may receive (134) first data corresponding to a previous utterance. The previous utterance may correspond to the same dialog session as the first utterance. The previous utterance may be spoken prior to the first utterance within the dialog session. Thus the first data may include data representing some text from the previous utterance. For example, the first data may include a feature vector representing the entire text of the previous utterance. In some embodiments, the first data may include multiple feature vectors, where one feature vector represents some portion (such as one word) of the previous utterance. Thus the first data may include multiple word embedding data vectors (explained further below), where each word embedding data vector represents one word of the previous utterance.

The system(s) 120 may also receive (136) second data corresponding to a system generated response to the previous utterance. The first utterance, the previous utterance and the system generated response may correspond to the same dialog session. Text of the system generated response may be generated using NLU/dialog management techniques for example using NLU component 260 and/or dialog tracker 265 discussed below. Audio for the system generated response may be generated using text-to-speech techniques described herein. The system generated response may have been outputted by the device 110 prior to the first utterance on which ASR is performed (132). The second data may include data representing some text from the system generated response. For example, the second data may include a feature vector representing the entire system generated response. In some embodiments, the second data may include multiple feature vectors, where one feature vector represents some portion (such as one word) of the system generated response. Thus, the second data may include multiple word embedding data vectors, where one word embedding data vector represents each word of the system generated response.

The system(s) 120 may then process (138) the first data, the second data and at least a portion of the language model output data to generate modified language model output data. The language model output data may include the ASR hypotheses, only with different scores. A dialog rescorer engine (259), described below, may process the first data corresponding to the previous utterance, the second data corresponding to the system generated response to the previous utterance, and at least a portion of the language model output data corresponding to the first utterance. The first data, the second data and the language model output data may be processed to determine new scores for the ASR hypotheses for the first utterance. For example, the system(s) 120 may determine, based on the processing (138) a third score for the first ASR hypothesis and a fourth score for the second ASR hypothesis. To determine the new scores, the system(s) 120 may process the first data, the second data and the language model output data using a trained machine-learning model.

In an example embodiment, the system(s) 120 may also process dialog metadata (e.g., metadata 1116 as discussed below) corresponding to the dialog sessions to rescore the ASR hypotheses. The dialog metadata may be represented as a feature vector, and may include data that provides contextual information for some portion of the dialog session or the first utterance. For example, the dialog metadata may include topic data related to the dialog session or the first utterance, or part-of-speech data related to the first utterance.

In an example embodiment, the system(s) 120 may determine a plurality of word embedding data vectors, where each word embedding data vector corresponds to a respective word of the system generated response. The system(s) 120 may then determine a composite word embedding data vector by averaging the plurality of word embedding data vectors. The system(s) 120 may also determine a single word embedding data vector corresponding to a first word of the previous utterance. In this case, the system(s) 120 processes the composite word embedding data vector, the single word embedding data vector and at least a portion of the language model output data to determine the new scores or updated scores for the ASR hypotheses for the first utterance.

In another embodiment, the system(s) 120 may determine a first word embedding data vector corresponding to a first word of the system generated response and a second word embedding data vector corresponding to a first word of the previous utterance. The system(s) 120 may determine new scores or updated scores for the ASR hypotheses by processing the first word embedding data vector, the second word embedding data vector and at least a portion of the language model output data.

The system(s) 120 may select (140) an ASR hypothesis for the first utterance based on the new scores or updated scores determined by the system(s) 120 at step 138. Thus the system(s) 120 may select the ASR hypothesis with the highest score of the new scores. For example, the system(s) 120 may select the first ASR hypothesis based on the third score. The third score may be higher than the fourth score, where better ASR hypotheses have a higher score. Alternatively, the third score may be lower than the fourth score, where better ASR hypotheses have a lower score. The system(s) 120 may then perform (142) some action using that highest rescored ASR hypothesis. Such an action may include performing NLU operations using the highest rescored ASR hypothesis, executing a command corresponding to the highest rescored ASR hypothesis, sending command data corresponding to the highest rescored ASR hypothesis to a further component (e.g., the orchestrator 230, dialog tracker 265, skill system 225, etc.), or otherwise generate output data using the selected ASR hypothesis.

When the system(s) 120 receives a user input, the system(s) 120 may associate the data (e.g., audio data) representing the user input with a dialog session identifier. The system(s) 120 may associate the dialog session identifier with output data (e.g., output audio, or TTS response) generated by the system in response to the user input. The system(s) 120 may identify that the user input and the system generated response are part of a dialog exchange between the user and the device 110, and may track the dialog using the dialog session identifier. The dialog session identifier may be associated with various speech processing data (e.g., ASR results data, NLU results data, ASR rescore results data, etc.) related to processing of the user input. The foregoing is illustrative and, thus, one skilled in the art will appreciate that a dialog session identifier may be used to track data transmitted between various components of the system(s) 120.

Thus the dialog rescorer engine 259 may take ASR output data (e.g., the ASR hypotheses and corresponding scores) and may assign certain (or all) ASR hypotheses new scores where the new scores are determined using the old scores as well as some information (e.g., the first data and second data) of some previous portion of the dialog both user generated and system generated. In this manner the system may be better configured to incorporate the context of the dialog when selecting an ASR hypothesis, thus generally resulting in improved ASR processing and a better user experience.

The overall system of the present disclosure may operate using various components as illustrated in FIG. 2A. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include a dialog tracker component 265 that manages and/or tracks a dialog between a user and a device. The dialog tracker component 265 may associate a dialog session identifier with the dialog upon identifying that the user is engaging in a dialog with the user. The dialog tracker component 265 may track a user input and the corresponding system generated response to the user input as a turn. The dialog session identifier may correspond to multiple turns of user input and corresponding system generated response. The dialog tracker component 265 may transmit data identified by the dialog session identifier directly to the ASR component 250 or via the orchestrator component 230. In an example embodiment, the dialog rescore engine 259 uses data tracked by the dialog tracker component 265. Depending on system configuration the dialog tracker 265 may determine the appropriate system generated response to give to a particular utterance or user input of a turn. Or creation of the system generated response may be managed by another component of the system (e.g., the orchestrator 230, NLU component 260, etc.). The text of a system generated response may be sent to a TTS component 280 for creation of audio data corresponding to the response. The audio data may then be sent to a user device (e.g., device 110) for ultimate output to the user.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2B:
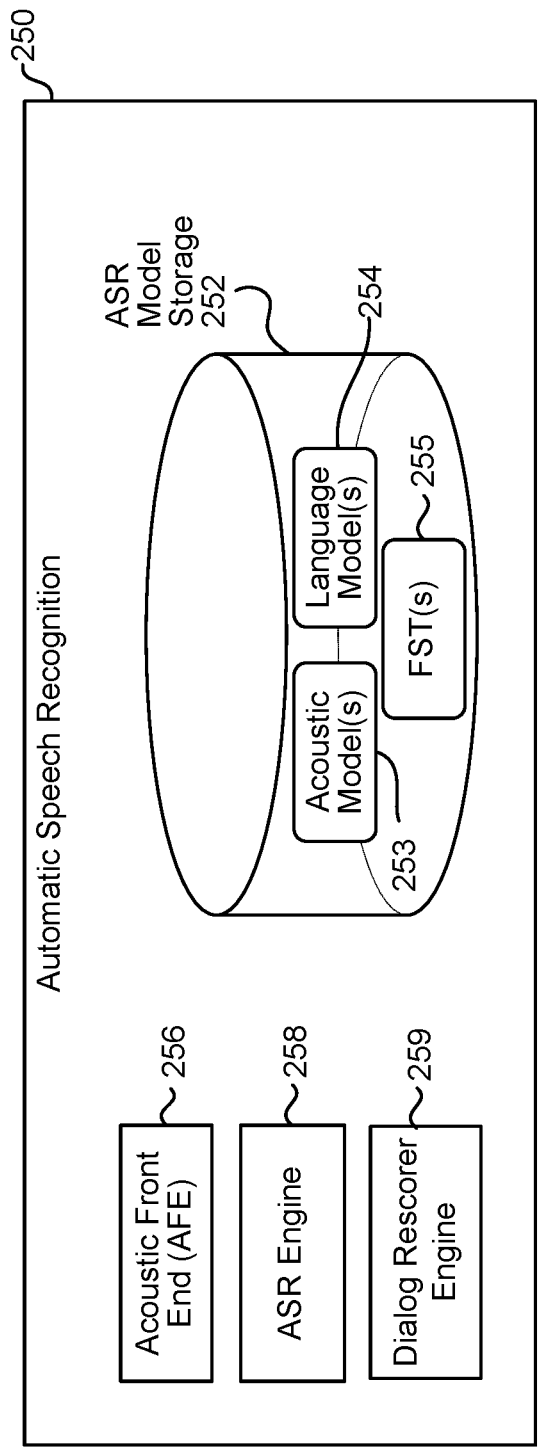
FIG. 2B is a conceptual diagram of automatic speech recognition components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
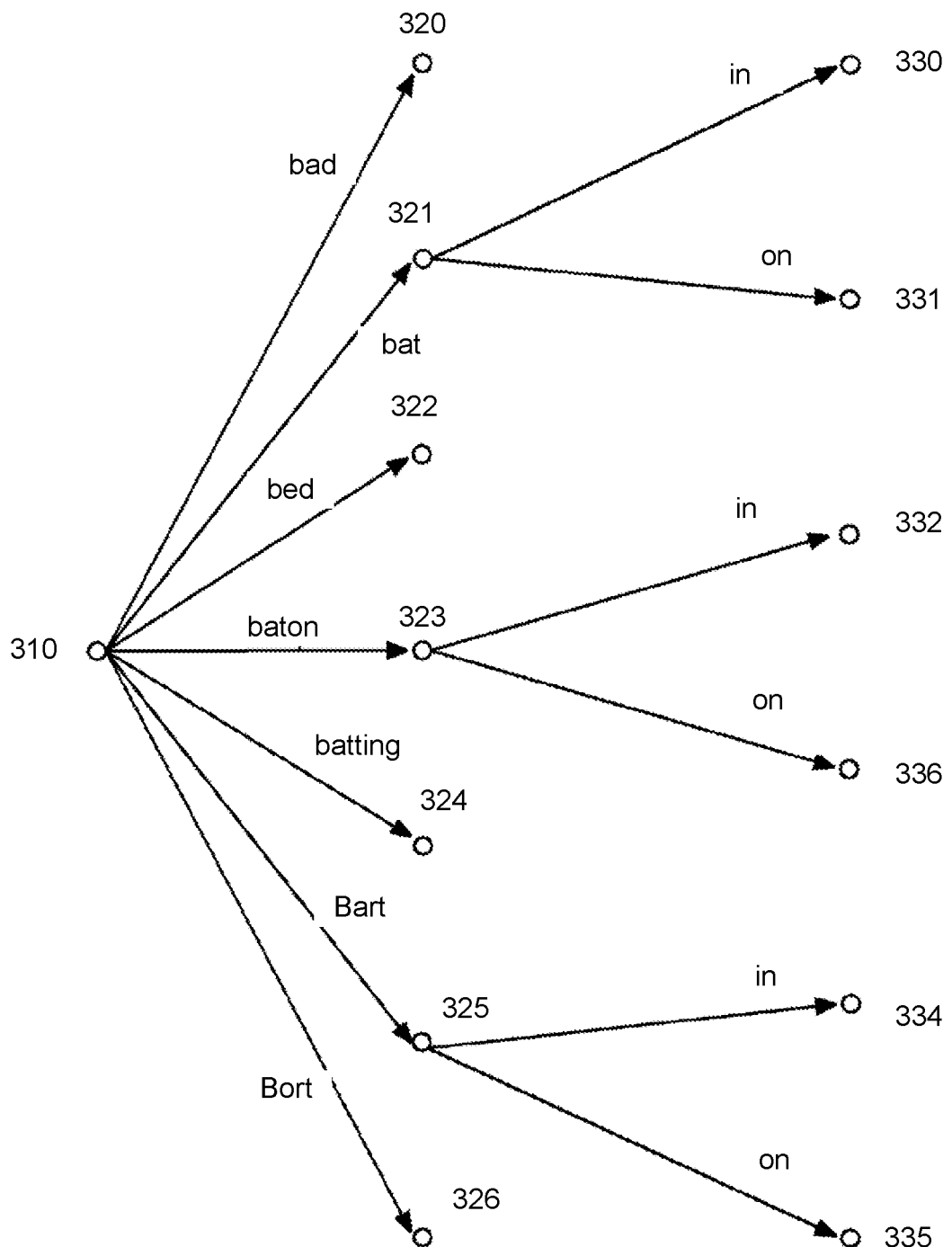
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR component 250, e.g., the dialog rescorer engine 259) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts. As described below, the N-best list is used by the dialog rescorer engine 259 to rescore the hypotheses included in the N-best list using dialog session data, such as previous user utterances and system generated responses to the utterances.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be created by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar FST, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by an ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST, the score of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate a different section of an ASR FST. In particular, FIGS. 4A-4D illustrate a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]: [output label]/[score]. Thus, for example, arc 402 outgoing from state 0 to state 2 has an input label of 10, an output label of <eps> (explained below) and a score of 0.15137. The scores illustrated in FIGS. 4A-4D represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (∈). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
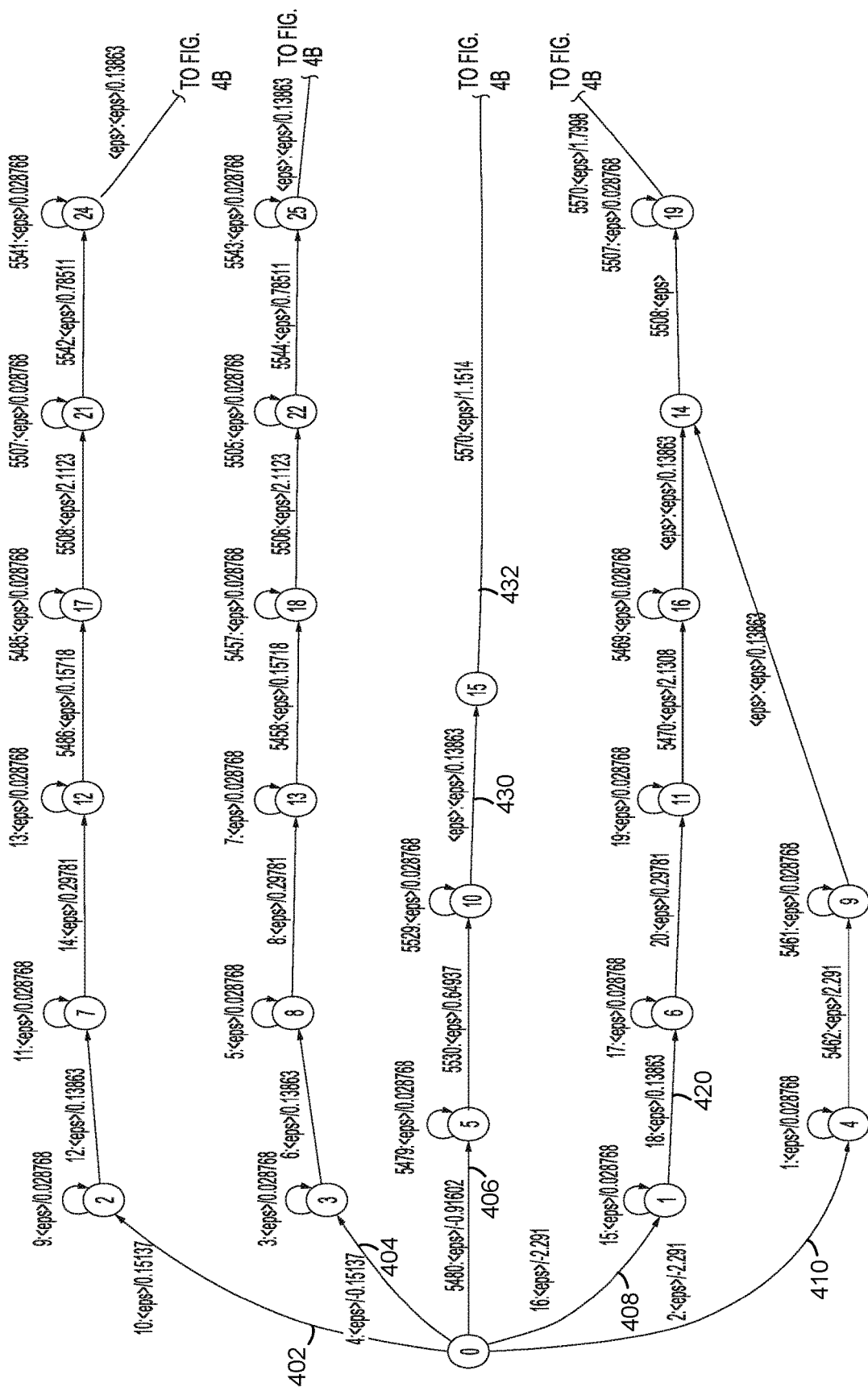
Figure 4B:
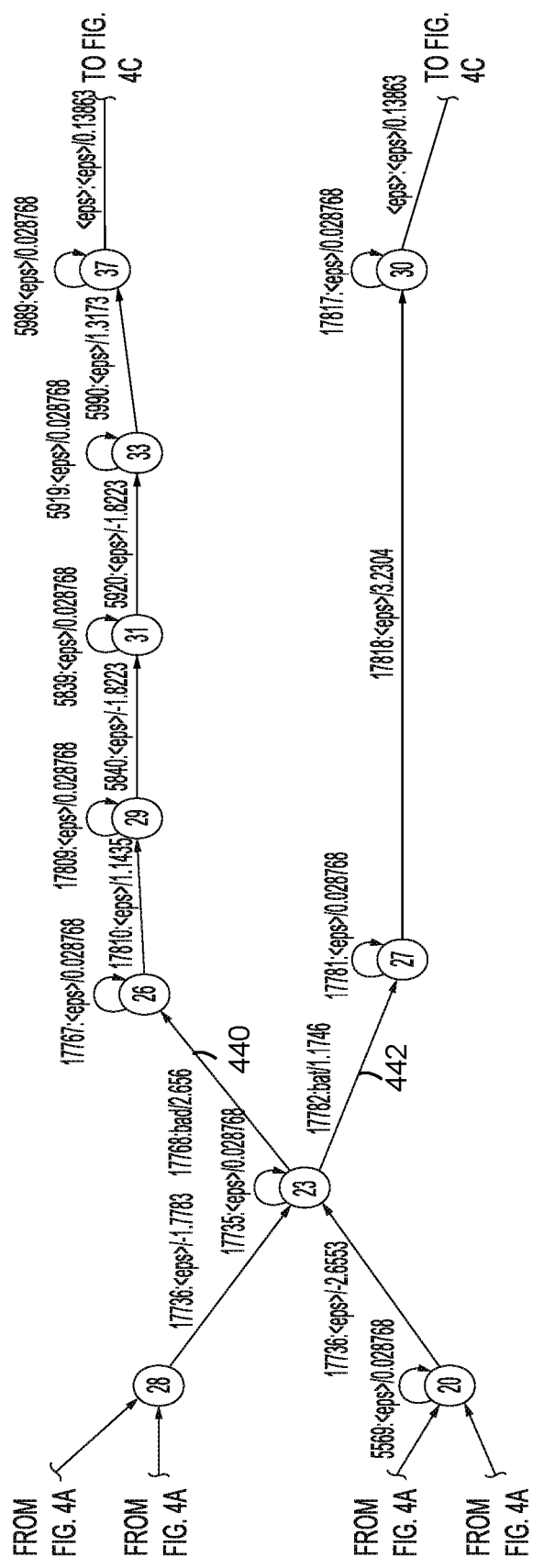
Figure 4D:
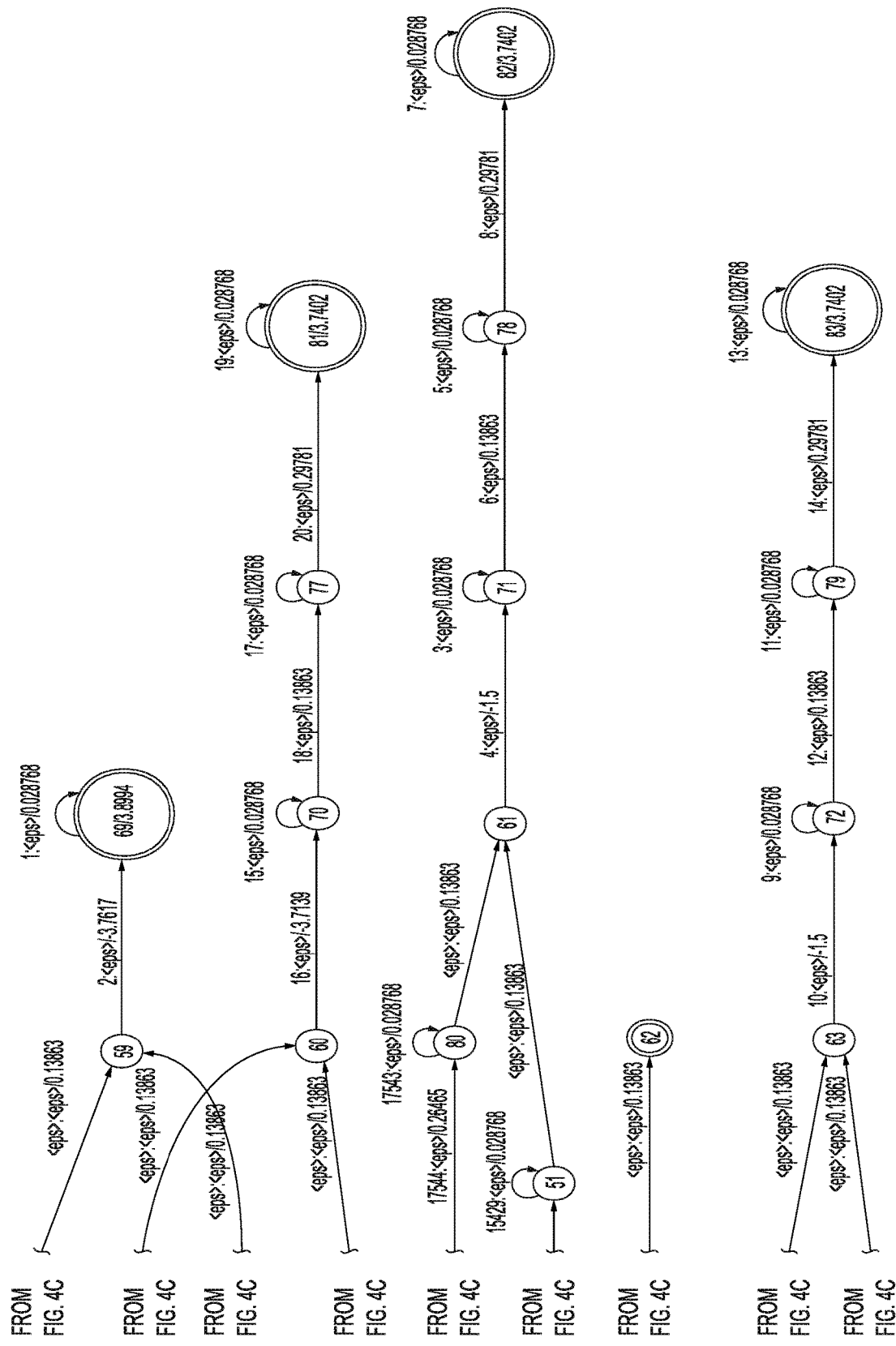

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon (E) input label, and
(4) Number of outgoing arcs with epsilon (E) output label.

Each of these fields may be represented by a particular N-bit integer (e.g., 16, 32, etc.). The integer size for a particular field may be different from that of a different field.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR speech recognition 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)
Updated score for 404=0.84451+($s_2$*sf)
Updated score for 406=−0.22287+($s_3$*sf)
Updated score for 408=−1.5979+($s_4$*sf)
Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic unit, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the speech recognition engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the engine 258 may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the speech recognition engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
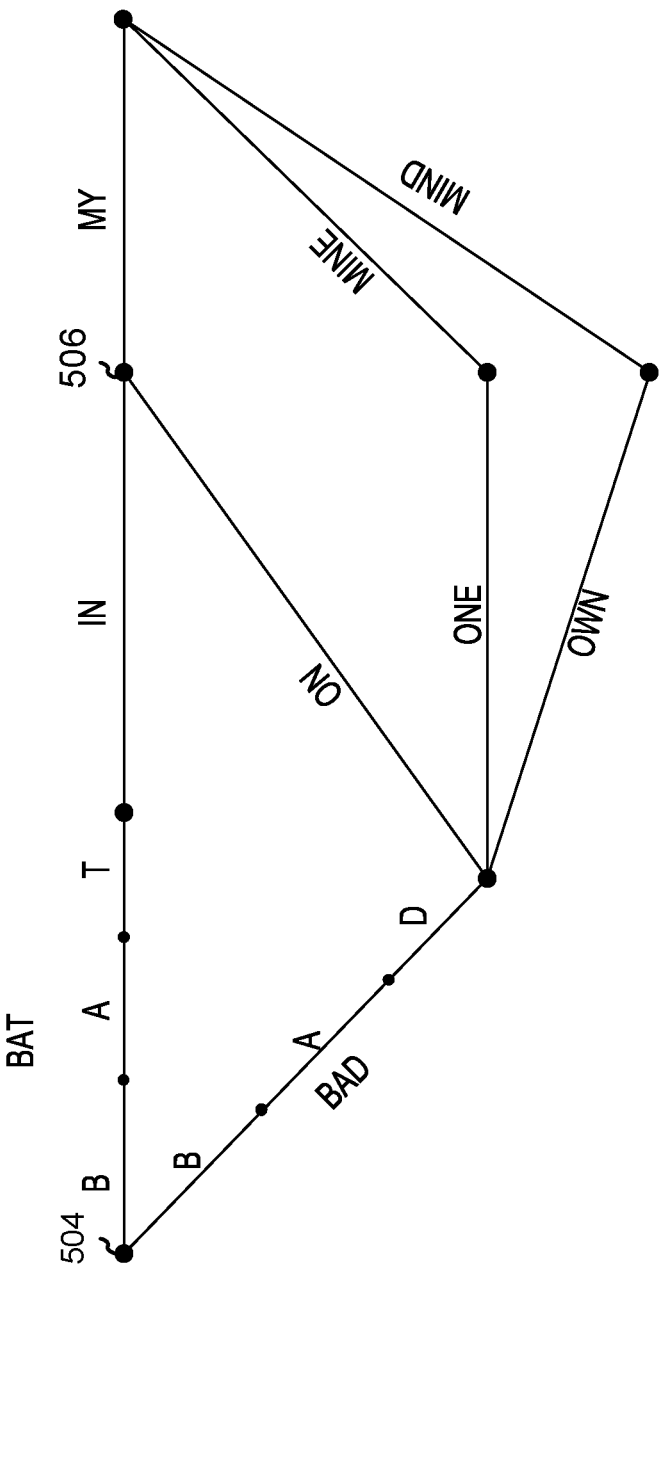
FIG. 5 illustrates a word lattice according to embodiments of the present disclosure.

As the ASR engine 258 traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a skill(s) component 290 for further processing (such as execution of a command included in the interpreted text). Thus the data preserved by the ASR engine 258 during traversal of the FST may result in a lattice representing the most likely ASR results (as the least likely results were discarded during pruning). The mostly likely path of the ASR results, sometimes called the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such a situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
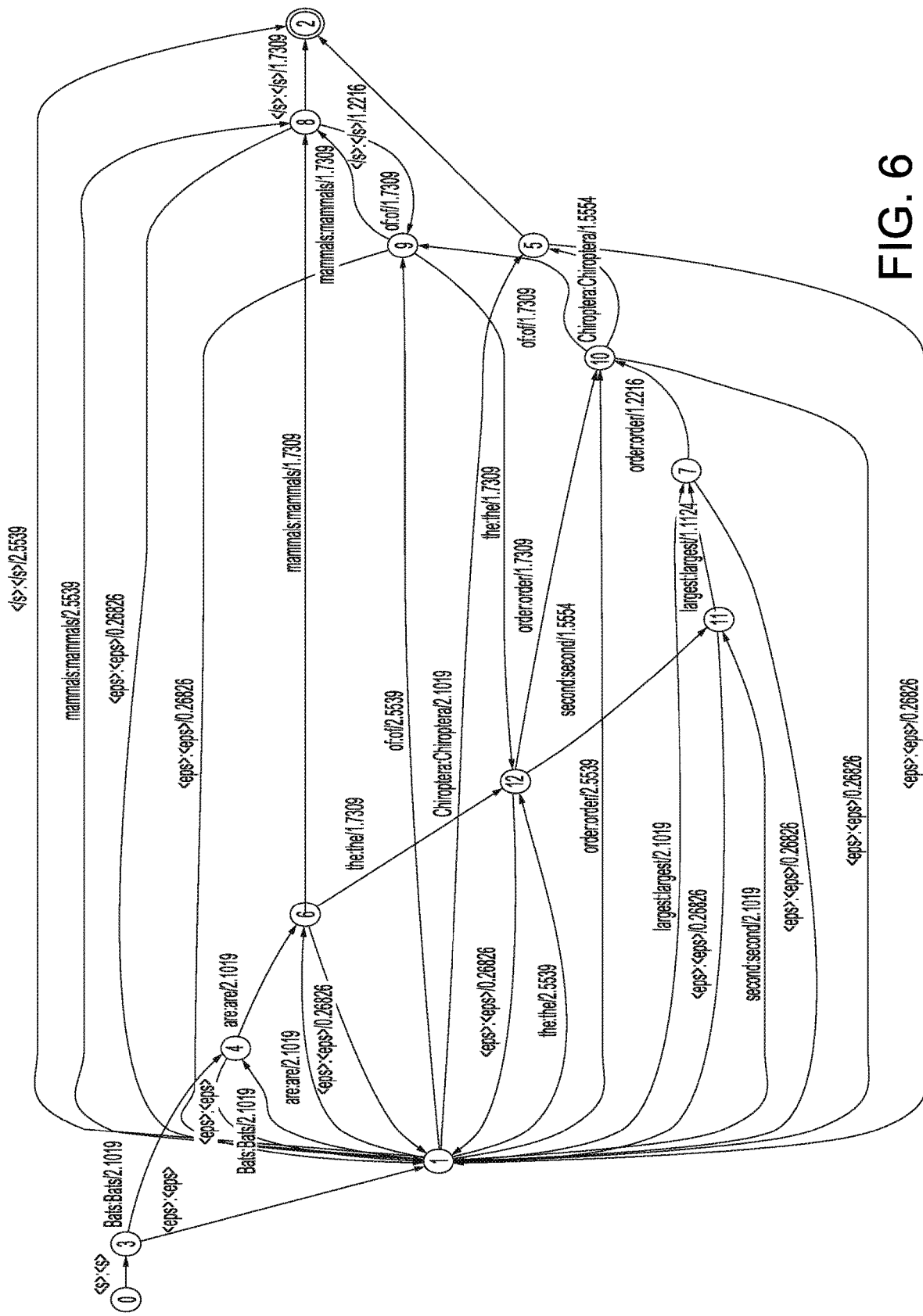
FIG. 6 illustrates a section of a finite state transducer according to embodiments of the present disclosure.

An example of a portion of a G FST is shown in FIG. 6. The FST portion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (also called a bi-gram) includes two words in order for example "I am," "I think," or the like. A size 3 N-gram (also called a trigram) includes three words in order for example "I like to," "I need to," or the like. Certain benefits to representing word groupings as N-grams in a language model FST include their ease of construction, fast computation during runtime decoding of input speech and efficient representation within the FST.

Figure 7:
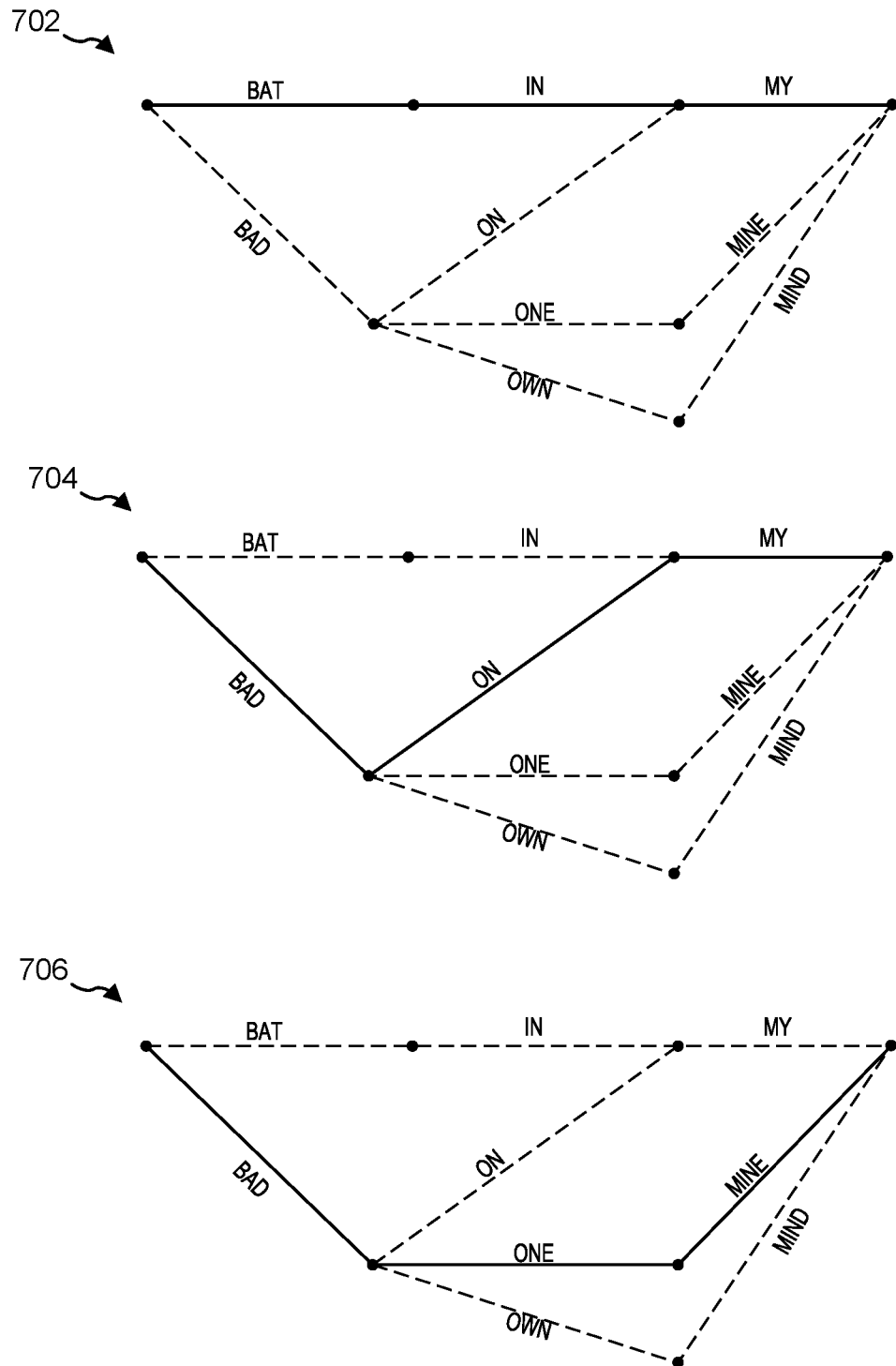
FIG. 7 illustrates different ways of traversing the lattice of FIG. 5 according to embodiments of the present disclosure.
Figure 8:
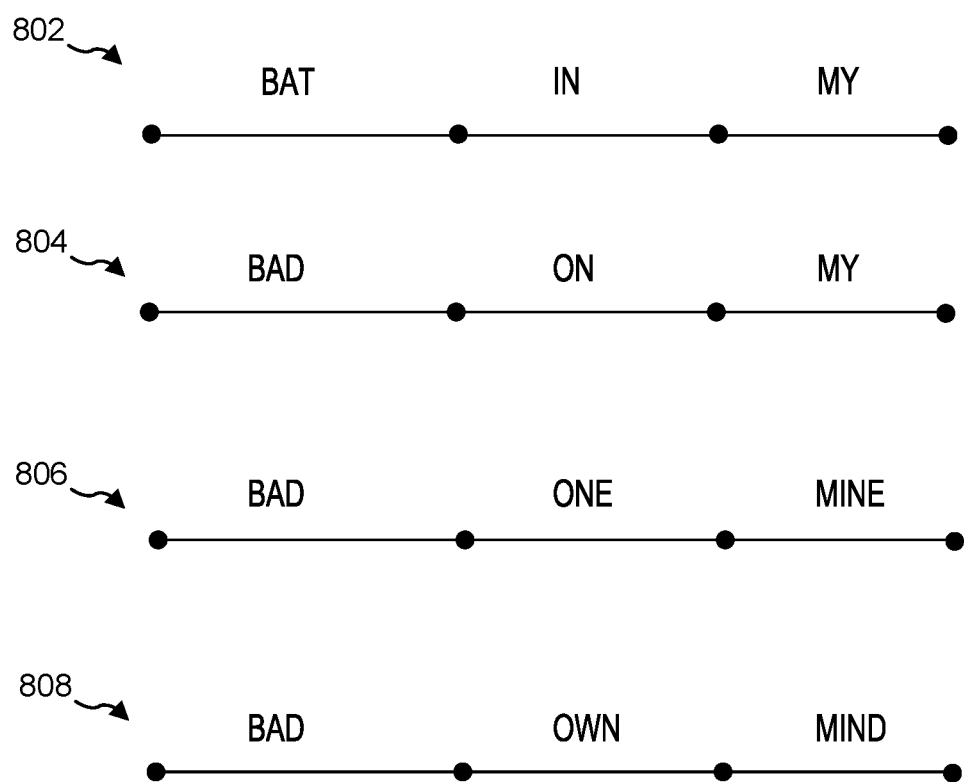
FIG. 8 illustrates an N-best list of hypotheses associated with the lattice of FIG. 5 according to embodiments of the present disclosure.

To simplify the illustration of traversing different path results, illustrated in FIG. 7 are different potential paths along the lattice 502. As shown in FIG. 7, path 702 results in "bat in my," path 704 results in "bad on my" and path 706 results in "bad one mine." As can be seen, many such paths are possible even in the small example lattice 502. An example of such paths 802, 804, 806, and 808 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component (such as component operating a language model) may output an N-best list, such as the list of potential results shown in FIG. 8, may output a single top scoring answer (e.g., 802) or may output an entire lattice as well as corresponding scores.

In addition to the traditional top sentence of words or N-best result, an ASR component may be configured to output various data calculated by the ASR component during processing. Such data may include, for example, speech units (such as phones), probabilities/scores associated with certain speech units or words, audio frame timing, or the like. A system may be configured to use such data to perform various tasks, for example to confirm the results of ASR processing, which may in turn be used to perform various processing to update a store of facts and information available to a system for query answering.

To perform ASR effectively, however, certain techniques may be employed to incorporate certain information in ASR processing, such as dialog data from user inputs and system responses. One such technique, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) relate to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

Figure 9:
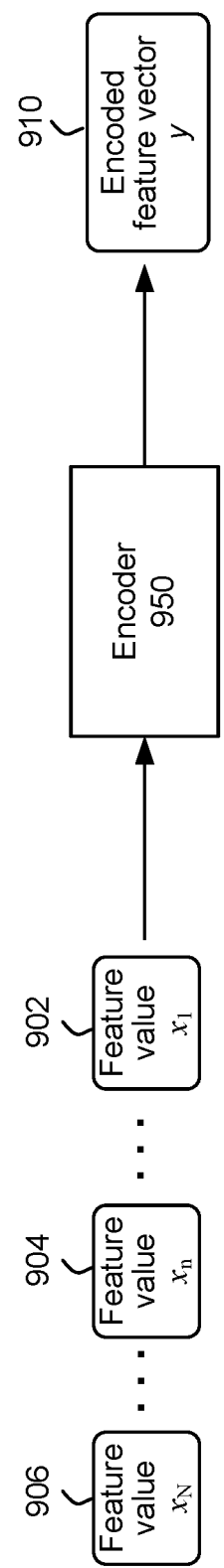
FIG. 9 illustrates operation of an encoder according to embodiments of the present disclosure.

FIG. 9 illustrates feature data values 902-906 being processed by an encoder 950 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on user of the encoded vector and other system configurations. Any particular encoder 950 will be configured to output vectors of the same size, thus ensuring a continuity of output encoded vector size from any particular encoder 950 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence.

In addition, an attention model can be used, which is another RNN or DNN that learns to "attract" attention to certain parts of the input. The attention model can be used in combination with the above methods of consuming the input.

FIG. 9 illustrates operation of the encoder 950. The input feature value sequence, starting with feature value $x_1$ 902, continuing through feature value $x_n$ 904 and concluding with feature value $x_N$ 906 is input into the encoder 950. The encoder 950 may process the input feature values as noted above. The encoder 950 outputs the encoded feature vector y 910, which is a fixed length feature vector of length F. One or more encoders such as 950 may be used with the dialog rescorer engine 259 as indicated below.

For ASR processing the base input is typically audio data in the form of audio frames. However, as noted herein, to improve ASR processing, and in particular to rescore hypotheses output from language model processing, a system may be configured to encode text data that may include one or more word sequences (for example dialog data from one or more previous exchanges with the system during a dialog) and use that encoded text data to rescore hypotheses to obtain the hypothesis most relevant to the state of the dialog.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Thus components of the system (such as a dialog rescorer engine 259) may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 10:
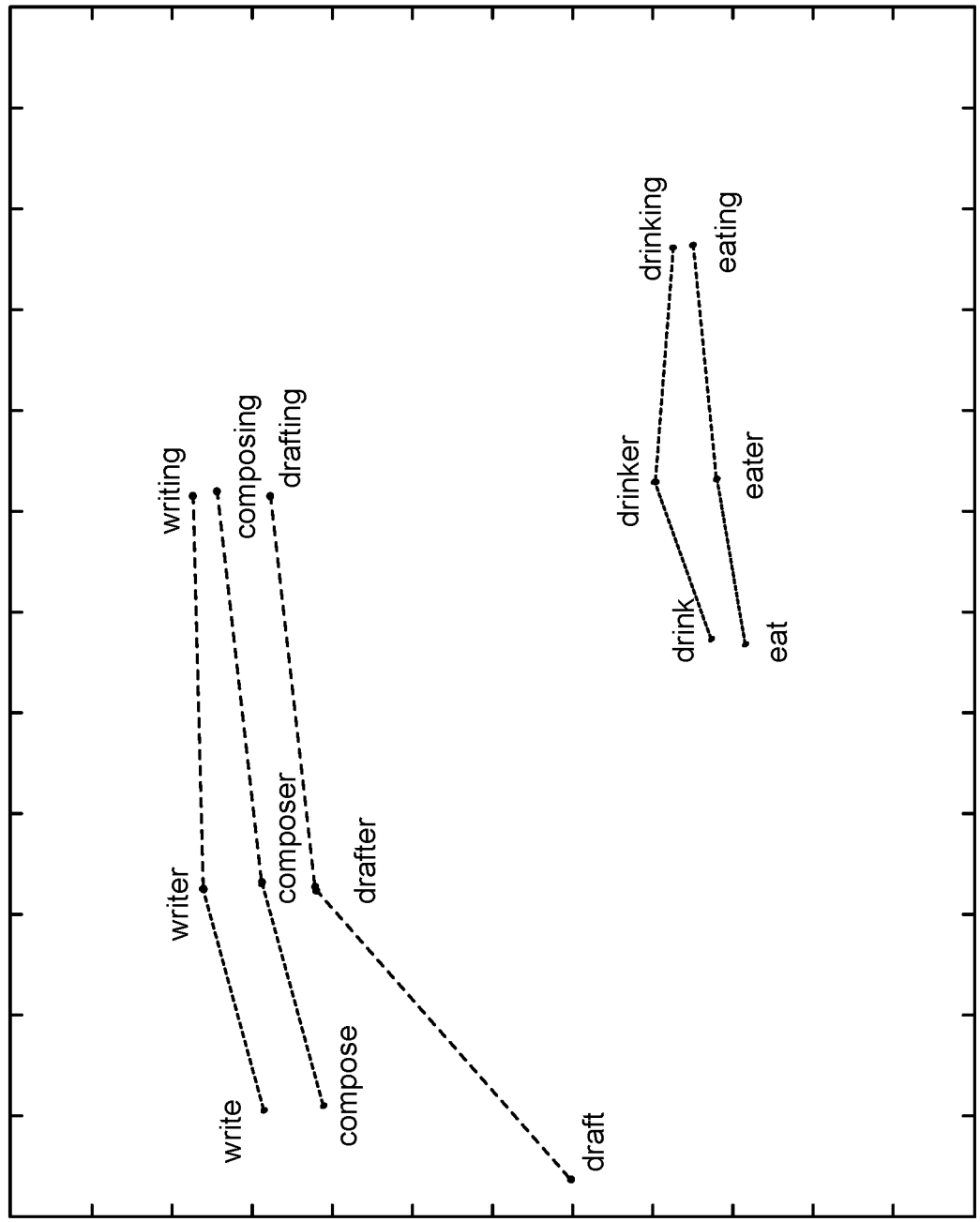
FIG. 10 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 10 illustrates a number of words in a hypothetical vector space where each point represents the vector location for the particular word. Although illustrated as located in a two-dimensional graph for discussion purposes, the usage vectors for the words illustrated in FIG. 10 would be in a high dimensional space. Further, FIG. 10 is shown for example purposes only and the vector locations/relationships do not necessarily reflect a true graphing of the usage of the illustrated words.

As illustrated in FIG. 10, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 10. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, and others.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

ASR systems are a key component in conversational devices. In order for the conversational device (also known as bots) to create an enjoyable experience for the user it must first correctly understand what is being said. As described herein, one approach to building an ASR system is having an Acoustic Model (AM) to model input observations and a Language Model (LM) to help search over sequences of words. Typically these LMs are n-gram based models trained on large text corpora. These models are trained to predict the conditional word probabilities given the context of the previous n−1 words. Most ASR systems have a rescoring component for LMs that involves replacing the LM score from a first pass ASR model with an LM score from a stronger model. The system described herein includes a dialog rescorer engine 259 that rescores hypotheses generated by a first pass ASR system using contextual data derived from a dialog session between a user and a device. As described herein, a dialog session refers to a dialog exchange between a user 5 and a device 110, where the user 5 speaks one or more utterances and the device 110 generates a text-to-speech response to each of the utterances. The dialog tracker 265 tracks the user utterances and the corresponding system generated responses for use by the dialog rescorer engine 259. The dialog rescorer engine 259 may rescore the LM scores generated by the ASR engine 258. The rescored LM may be combined with the acoustic model scores generated by the ASR engine 258 to determine the best hypothesis for the speech recognition process.

Figure 11:
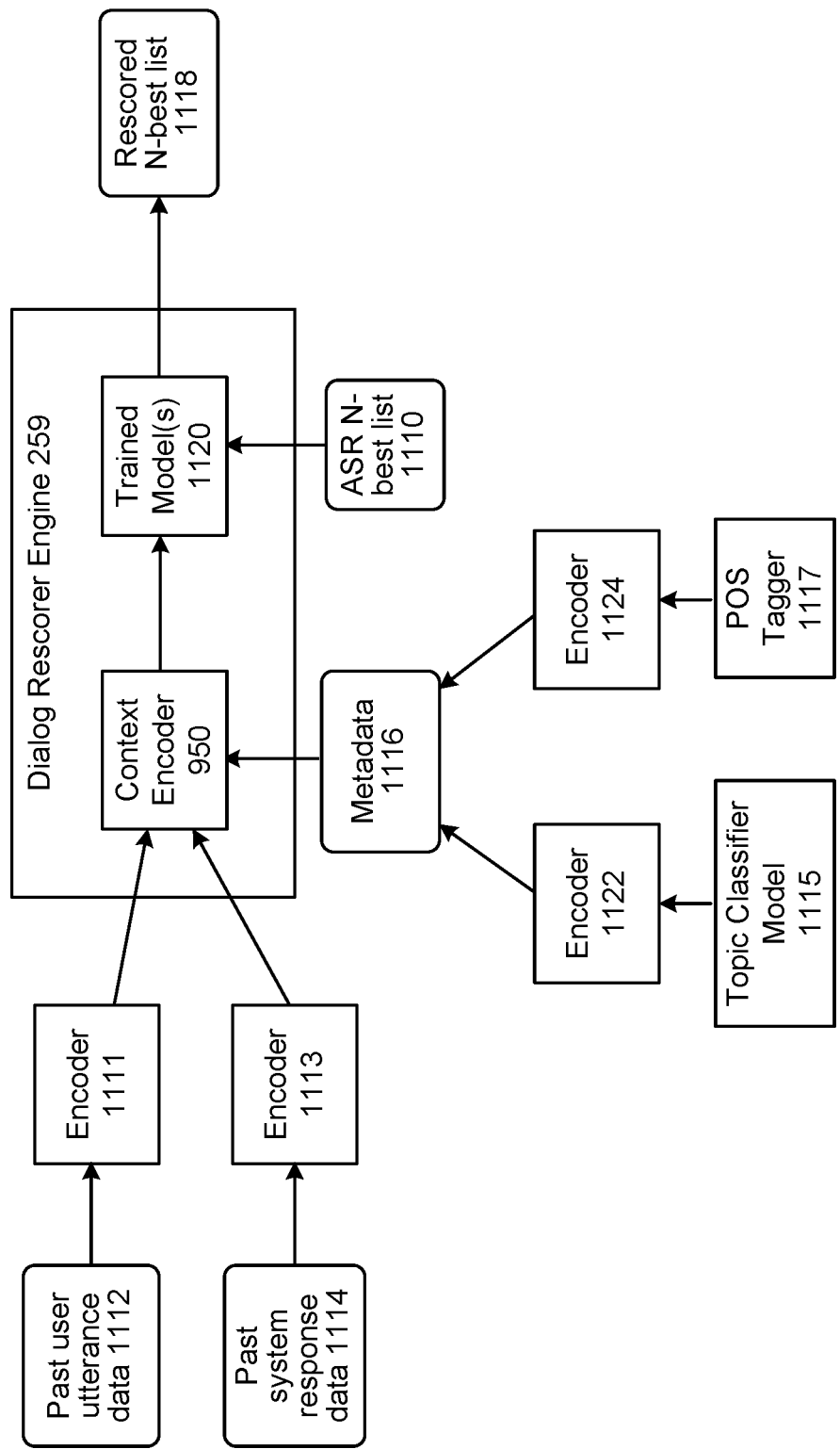
FIG. 11 is a block diagram conceptually illustrating a dialog rescorer engine 259, according to embodiments of the present disclosure.

FIG. 11 is a block diagram conceptually illustrating a dialog rescorer engine 259, according to an example embodiment. The dialog rescorer engine 259 may include a context encoder 950 to encode dialog session data. Details of the context encoder 950 are described above in relation to FIG. 9. The dialog rescorer engine 259 also includes one or more trained models 1120 to process the encoded inputs and ASR N-best list 1110 for the current user utterance and output rescored ASR hypotheses (1118) based on the dialog session data. To rescore the ASR N-best list hypotheses, the dialog rescorer engine 259 may process data using a trained machine learning model 1120. The trained model 1120 may process different portions of the data during each cycle or time-step. In an example embodiment, at each time-step the trained model 1120 may process data representing one word of a user utterance or a system generated response. For example, for a first time-step the trained model 1120 may receive data representing a first word of a user utterance, along with other input data described below (e.g., system generated responses, metadata, etc.), and process the received data to generate language model output data including one or more ASR hypotheses for the first word of the user utterance. For a second time-step the trained model 1120 may receive data representing a second word of the user utterance, along with other input data described below (e.g., system generated responses, metadata, the language model output data after the first time-step, etc.), and process the received data to generate language model data including one or more ASR hypotheses for the second word of the user utterance. The results (e.g., parameters, weights, etc. of the machine learning model) of processing a particular portion of the data during the previous time-step may be inputted at the current time-step when processing a different portion of the data. After processing the data for a predefined number of time-steps, the output of the trained model 1120 may be a new score for the hypotheses in the ASR N-best list 1110. In other embodiments the output of the trained model 1120 may be a list of new hypotheses for the user utterance. The hidden state of the trained model(s) 1120 may be initialized by the output of the context encoder 950. The ASR N-best list 1110 may include data output by an ASR component, such as language model output data. The ASR N-best list 1110 may include ASR hypotheses for the current user utterance and their respective scores.

The input data for the dialog rescorer engine 259 includes an ASR N-best list 1110 (e.g., language model output data)

that is a list of hypotheses with corresponding scores for a user utterance that may be generated by the ASR engine 258. The ASR N-best list 1110 may be ASR hypotheses generated by the ASR engine 258 for a current user utterance (e.g., first utterance in 130 of FIG. 1) in a dialog session between a user 5 and a device 110. The ASR engine 258 performs a first-pass of speech recognition and generates a lattice (example illustrated in FIG. 5). The n highest scoring hypotheses are extracted from the lattice (example illustrated in FIG. 8) to create the ASR N-best list 1110. The input data 1110 may also include other related data, such as additional output data of the language model executed by the ASR engine 258. As noted above, a dialog session refers to an exchange of dialog between a user and a device, and may be identified by a session identifier.

Other input data for the dialog rescorer engine 259 may include data for past user utterances 1112 (e.g., first data corresponding to text of a previous utterance in 134 of FIG. 1) and data for past system responses 1114 (e.g., second data corresponding to text if a system generated response to the previous utterance in 136 of FIG. 1) for the dialog session. The past user utterances 1112 may include one or more utterances spoken by the user 5 during the dialog session prior to the current user utterance that corresponds to the ASR N-best list 1110. The past system responses 1114 may be one or more responses generated by the device 110 during the dialog session in response to user utterances prior to the present user utterance that corresponds to the ASR N-best list 1110. The dialog rescorer engine 259 uses the contextual data provided by the past user utterances 1112 and past system responses 1114 to rescore the ASR N-best list 1110 for a particular utterance in a dialog. An encoder 1111 may encode the past user utterance data 1112. A separate encoder 1113 may encode the past system response data 1114. The encoders 1111 and 1113 may be examples of the encoder 950 described above in relation with FIG. 9.

The past user utterances 1112 may be represented by one or more feature vectors, such as one or more word embeddings. The past system responses 1114 may also be represented by one or more feature vectors, such as one or more word embeddings. As described above in detail, a word embedding is a representation of a word in the form of a multi-dimensional data vector, where each dimension represents some data point regarding the word, its usage, or other information about the word.

In an example embodiment, metadata 1116 is also inputted into the dialog rescorer engine 259. The metadata 1116 may be a feature vector representing data such as topic information corresponding to the present user utterance or dialog, and/or part-of-speech features or labels corresponding to the present user utterance. The metadata 1116 may also include other data that may provide more context information for the dialog session or the current user utterance. For example, the metadata 1116 may also include data related to current events and news, data from social media feeds, named entities, and the like. The metadata 1116 may also include relationships between entities (named in the utterance or system generated response), and the relationships may be determined from a knowledge base. The metadata 1116 may also include user-specific data such as user preferences, user history based on past interactions with the device, application data based on user interactions with the applications, and the like. The metadata 1116 may also include device information such as device type, device capabilities (display screen, multi-modal, etc.), and the like. The metadata 1116 may also include location data determined from the device, which may be used to determine metadata (current events, news, weather, etc.) corresponding to the location of the device. In an example embodiment the metadata 1116 is provided as input at every time-step to the trained model 1120 of the dialog rescorer engine 259. The topic information determined by the topic classifier model 1115 may be encoded by encoder 1122. The POS features determined by the POS tagger 1117 may be encoded by encoder 1124. Each type of metadata 1116 may be encoded using a different encoder, that is for example, the user-specific data may be encoded using one encoder, and the device information may be encoded using another encoder. The encoders 1122 and 1124 may be examples of encoder 950 described in relation to FIG. 9. The context encoder 950 may concatenate the metadata 1116 with the past user utterances data 1112 and/or the past system responses data 1114 to generate the input for the trained model 1120.

The part-of-speech features or labels may be determined by a parts-of-speech (POS) tagger 1117 that marks up each word in the user utterance as corresponding to a particular part of speech, such as nouns, verbs, adjectives, adverbs, etc., based on the word's relationship with adjacent words or other words in the utterance. The POS tagger 1117 may implement one or more natural language processing algorithms, rule-based algorithms, stochastic algorithms, and the like. For example, a natural language processing algorithm, which may utilize a greedy averaged perceptron tagger, may be used to determine the part-of-speech features or labels. The topic information may be identified using a topic classifier model 1115, which may use a 2-layer feedforward DNN based on average word embeddings as input. Using topic information for rescoring enables the rescorer language model to learn a relationship between the topic of the system generated response and that of the instant user utterance.

In an example embodiment, the topic information may be determined based on a user utterance. The metadata 1116 based on the topic information may be the same at each time-step since it is based on the entire utterance. In an example embodiment, a POS feature may be determined based on the individual word in the utterance. The metadata 1116 based on the POS features is different at each time-steps since it is determined based on the individual words inputted at each time-step.

Figure 12A:
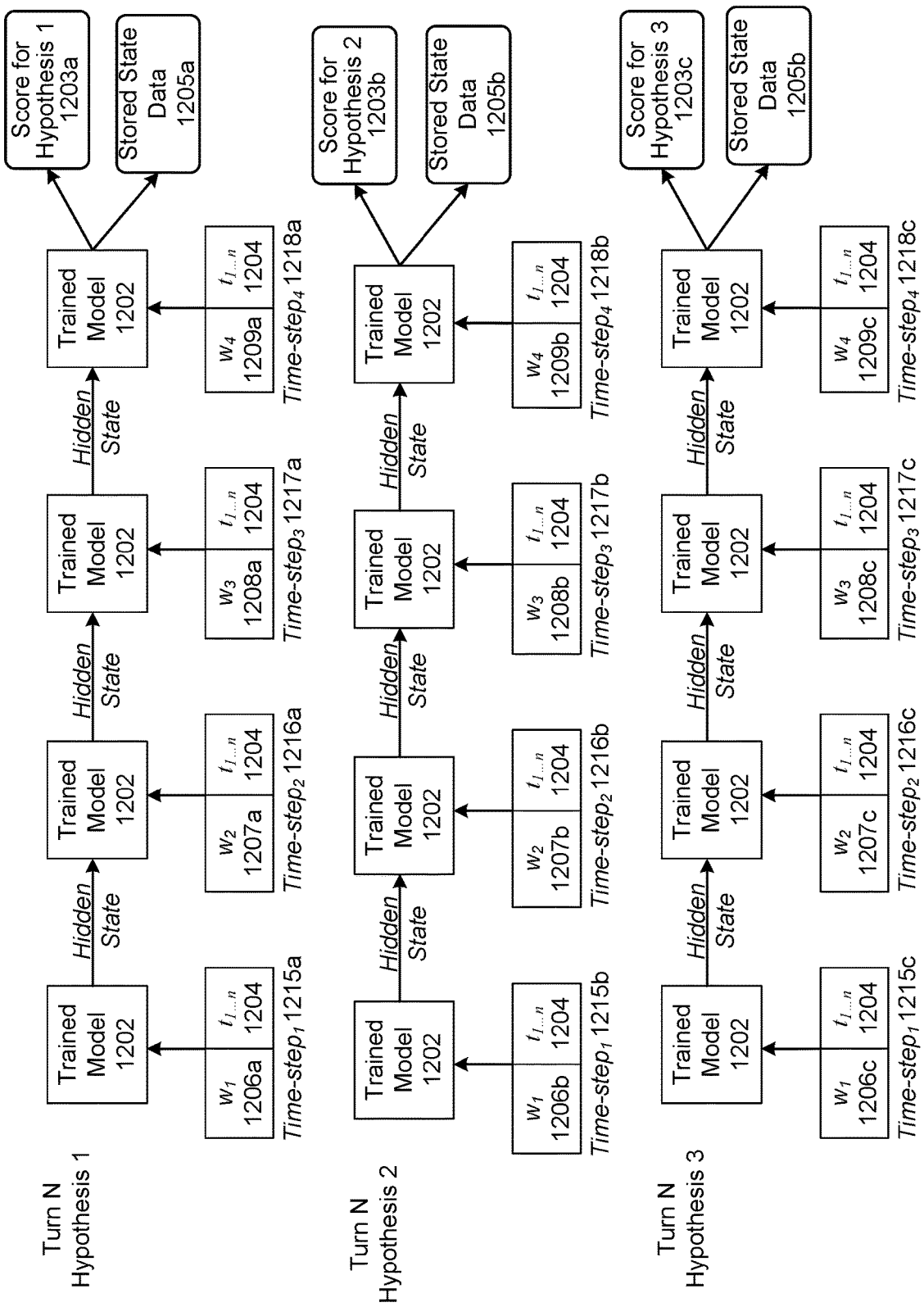
FIGS. 12A and 12B are block diagrams conceptually illustrating an average embedding context technique to encode dialog session data according to embodiments of the present disclosure.
Figure 12B:
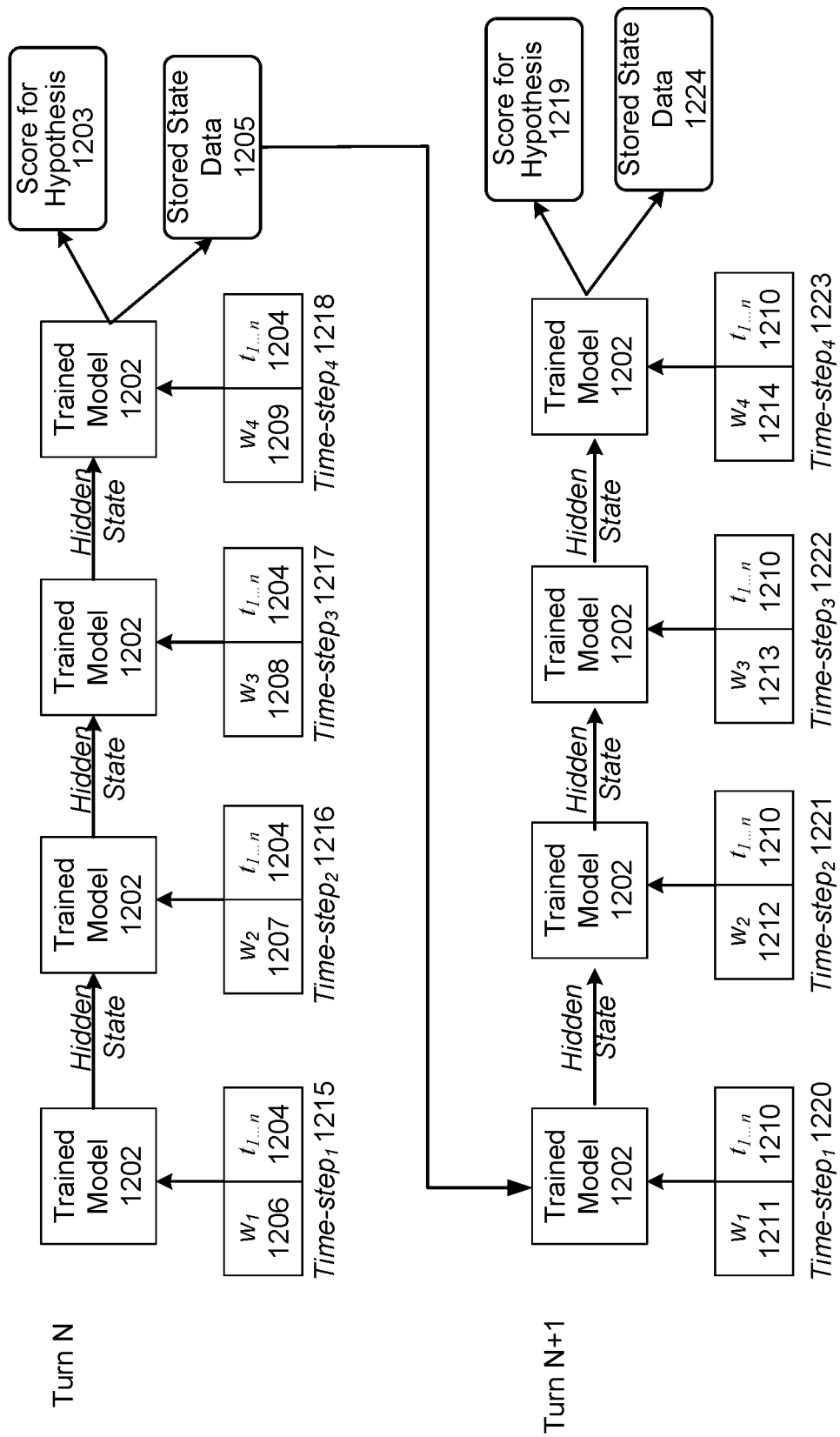

In an example embodiment, the dialog rescorer engine 259 employs a technique that uses average word embeddings to encode dialog session data for rescoring the hypotheses generated by the ASR engine 258. FIGS. 12A and 12B are block diagrams conceptually illustrating the technique using average word embeddings to encode dialog session data, according to an example embodiment. This technique utilizes the average of word embeddings (e.g., a composite word embedding data vector) to encode a system generated response. An average of the word embeddings may be calculated by adding a group of word embedding vectors together and then dividing by the number of word embedding vectors that were added. For example, the average word embedding vector for the system generated response may be calculated by adding the word embeddings representing the system generated response and dividing the total by the number of words in the system generated response. In one embodiment all words of the system generated response may be used in calculating the average. In other embodiments only certain words of the system generated response may be used with others disregarded for purposes of calculating the average (for example, words such as "the," "a," or the like may not be considered for this purpose). The average of word embeddings for the system generated response may be concatenated to the input of every time-step of the trained model for the dialog rescorer engine 259, as illustrated in FIGS. 12A and 12B. As described herein, the system generated responses (past system response data 1114) may be represented as multiple word embeddings, where one word embedding corresponds to one word of the system generated response. The technique illustrated in FIGS. 12A and 12B may be performed by one or more components of the dialog rescorer engine 259. For example, the context encoder 950 (e.g., 950*a*) may encode a word of the user utterance input, and the context encoder 950 (e.g., 950*b*) may calculate the average of the word embeddings of the system generated response (represented by past system response data 1114). The context encoder 950 may also concatenate the average of the word embeddings of the system generated response with the word of the user utterance (represented by past user utterance data 1112) to generate the input for each time-step of the trained model 1120 (referred to as trained model 1202 in FIG. 12).

As noted above, a turn refers to a user utterance and a corresponding system generated response to the user utterance. A dialog session may include one or more turns (Turn 1, Turn 2 . . . Turn N . . . Turn N+1), that is, one or more sets of a user utterance and a corresponding system generated response. One word of the current user utterance for Turn N (e.g., the first user utterance of 130 in FIG. 1) may be input into the trained model at every time-step, along with the average of the word embeddings of the system generated response corresponding to the previous user utterance of the previous turn—Turn N−1. For example, as illustrated in FIGS. 12A and 12B, one word of the user utterance input for Turn N is represented by $w_i$, where $w_1$ is the first word of the current user utterance, $w_2$ is the second word of the current user utterance, and so on. The user utterance input may be one of the ASR hypotheses (of the hypotheses in ASR N-best list 1110) for the user utterance. That is, $w_1$ may be the first word of a first hypothesis for the current user utterance, $w_2$ may be the second word of the first hypothesis for the current user utterance, and so on. The average of the word embeddings of the system generated response at Turn N−1 is represented by $t_{1 \ldots n}$.

As illustrated in FIG. 12A, the dialog rescorer engine 259 rescores each hypothesis for the user utterance of Turn N by processing an individual word of each hypothesis using the trained model 1120. The trained model 1202 is an example of the trained model 1120 of the dialog rescorer engine 259. As illustrated in FIG. 12A, for one hypothesis of the ASR N-best list 1110 for one turn of a dialog session (e.g., Turn N) the input for the trained model 1202 at a first time-step (e.g., Time-step$_1$ 1215) is the first word of the hypothesis for the user utterance spoken at Turn N $w_1$ (1206) and the average of the system generated response in the previous Turn N−1 $t_{1 \ldots n}$ (1204). The context encoder 950 may encode $w_1$ (1206) and $t_{1 \ldots n}$ (1204) to generate the input for the trained model 1202. At the second time-step (e.g., Time-step$_2$ 1215), the input to the trained model 1202 is the second word of the hypothesis for the user utterance spoken at Turn N $w_2$ (1207) and the average of the system generated response in the previous Turn N−1 $t_{1 \ldots n}$ (1204). The context encoder 950 may encode $w_2$ (1207) and $t_{1 \ldots n}$ (1204) to generate the input for the second time-step. The hidden state of the trained model 1202 after the first time-step is performed may be used to initialize the trained model for the second time-step Time-step$_2$ 1216. In this manner, the context information from a previous turn (Turn N−1) in the dialog session (in the form of the average word embedding of the system generated response for the previous turn) is considered when rescoring the user utterance of the current turn (Turn N). Additionally, the context information from the first word of the current user utterance is also considered when processing the second word when the hidden state of the trained model after the first time-step is used to initialize the trained model for the second time-step. Similarly, at the third time-step Time-step$_3$ 1217, the input to the trained model 1202 is the third word of the hypothesis for the user utterance spoken at Turn N $w_3$ (1208) encoded by the context encoder 950 and the average of the system generated response in the previous Turn N−1 $t_{1 \ldots n}$ (1204) encoded by the context encoder 950. The hidden state of the trained model 1202 after the second time-step is processed may be used to initialize the trained model for the third time-step. These steps may continue until all the words in the hypothesis for the current user utterance are processed, for example till Time-step$_4$ 1218, to generate a new or updated score 1203 for the hypothesis. The hidden state of the trained model 1202 after the last time-step (e.g., Time-step$_4$ 1218) may be stored (1205) to initialize the trained model 1202 for the next turn (e.g., Turn N+1 illustrated in FIG. 12B).

As illustrated in FIG. 12A, each hypothesis in the ASR N-best list 1110 is processed to rescore the hypothesis. That is, $w_1$ (1206*a*), $w_2$ (1207*a*), $w_3$ (1208*a*) and $w_4$ (1209*a*) correspond to a word of the first hypothesis for the current user utterance generated by the ASR engine 258, and the time-steps 1215*a*-1218*a* process the first hypothesis (word by word) of the ASR N-best list 1110 to generate a new score or updated score 1203*a* for the first hypothesis based on the system generated response at the previous Turn N−1. The hidden state of trained model 1202 after the last time-step is processed may be stored as stored state data 1205*a* for later use.

In an example embodiment, the dialog rescorer engine 259 then may similarly process a second hypothesis of the ASR N-best list 1110 to generate a new score or updated score 1230*b* for the second hypothesis based on the system generated response at the previous Turn N−1. For processing the second hypothesis, for example, the $w_1$ (1206*b*), $w_2$ (1207*b*), $w_3$ (1208*b*) and $w_4$ (1209*b*) correspond to a word of the second hypothesis for the current user utterance generated by the ASR engine 258, and the time-steps 1215*b*-1218*b* process the second hypothesis (word by word) of the ASR N-best list 1110. The dialog rescorer engine 259 may process each hypothesis of the ASR N-best list 1110 in this manner to generate a new or updated score 1203*b* for each hypothesis. The new or updated score for each hypothesis may be stored in memory. The hidden state of trained model 1202 after the last time-step is processed may be stored (1205*b*) for later use.

Although FIG. 12A illustrates three hypotheses, it should be understood that the process in FIG. 12A can be used to process fewer or more than three hypotheses. Also, each hypothesis may have a different number of words. For example, one hypothesis may have three words, another hypothesis may have four words, and so forth.

To continue use of the dialog context for analyzing the user utterance in the next turn (e.g., Turn N+1) of the dialog session, the dialog rescorer engine 259 may select the best hypothesis based on the new or updated scores generated for the current user utterance of Turn N. For example, for Turn N the dialog rescorer engine 259 may have processed three hypotheses as described above in relation to FIG. 12A, the new or updated scores (1203*a*, 1203*b*, 1203*c*) may be stored along with the hidden state (1205*a*, 1205*b*, 1205*c*) of the trained model 1202 after processing of the last time-step (e.g., Time-step 1218*a*, 1218*b*, 1218*c*). The dialog rescore engine 259 may determine that the second hypothesis, for example, has the best score 1203*b*, and may select the hidden state 1205*b* of the corresponding trained model for analyzing the next user utterance (e.g., spoken at Turn N+1) in the dialog session.

In an example embodiment, the new or updated scores for the hypothesis may be determined by combining the score for the hypothesis from the ASR N-best list 1110 with the score output by the dialog rescorer engine 259. The scores may be combined in a number of ways, summed, averaged, computing a weighted average, etc. Thus the system may determine an updated score for the hypothesis using a combination of scores, or potentially by simply using the score output by the dialog rescorer engine 259.

FIG. 12B illustrates processing of a user utterance spoken at the next turn. To continue use of the dialog context for the next turn (e.g., Turn N+1) of the dialog session, the hidden state 1205 of the trained model 1202 after the user utterance of Turn N is processed may be used to initialize the trained model 1202 for the first time-step for Turn N+1. In an example embodiment, the 'best' output of the trained model 1202 after all the hypotheses for the user utterance of Turn N is processed may be provided as input to the trained model 1202 for the first time-step for Turn N+1. The next turn (Turn N+1) is processed based on a different user utterance and the system generated response at the previous turn (Turn N). At the first time-step (e.g., Time-step$_1$ 1220) for Turn N+1, the context encoder 950 encodes the first word of the hypothesis for the current user utterance spoken at Turn N+1 $w_1$ (1211) and the average of the system generated response in the previous Turn N $t_{1...n}$ (1210) to generate the input for the trained model 1202. Similar to the process for Turn N, at the second time-step (e.g., Time-step$_2$ 1221) for Turn N+1, the input to the trained model 1202 is the second word of the hypothesis for the current user utterance spoken at Turn N+1 $w_2$ (1211) and the average of the system generated response in the previous Turn N $t_{1...n}$ (1210). The hidden state of the trained model 1202 after the first time-step may be used to initialize the trained model for the second time-step. These steps may continue until all the words in the user utterance for Turn N+1 are processed, for example till Time-step$_4$ 1223, to generate a new or updated score 1219 for the hypothesis for the user utterance spoken at Turn N+1. The hidden state of the trained model after the all the time-steps are processed may be stored (1224) for later use.

In an example embodiment, the dialog rescorer engine 259 then may similarly process the other hypotheses of the ASR N-best list 1110 for the user utterance spoken at Turn N+1 to generate a new score or updated score based on the system generated response at the previous Turn N. The hidden states of the trained model after the last time-step is processed may be stored for later use.

Although not shown, in an example embodiment, the trained model 1202 for Turn N+1 may include an attention mechanism to weight the internal states of the trained models after alone or more hypotheses for Turn N are processed. Using the attention mechanism, the past hidden states of the previous turn may be embedded and considered when processing future turns in the dialog.

The individual words of the user utterances (1206-1209 and 1211-1214) may be represented as a feature vector or a word embedding. The individual words of the user utterance input may be concatenated with the average of the corresponding system generated response $t_{1...n}$ (1204, 1210).

In an example embodiment, the metadata 1116 may be encoded by the context encoder 950 with the particular input at each time-step. For example, the context encoder 950 may concatenate the metadata 1116 with $w_1$ (1206) and $t_{1...n}$ (1204) at the first time-step of Turn N and may concatenate the metadata 1116 with $w_2$ (1207) and $t_{1...n}$ (1204) at the second time-step of Turn N.

Figure 13A:
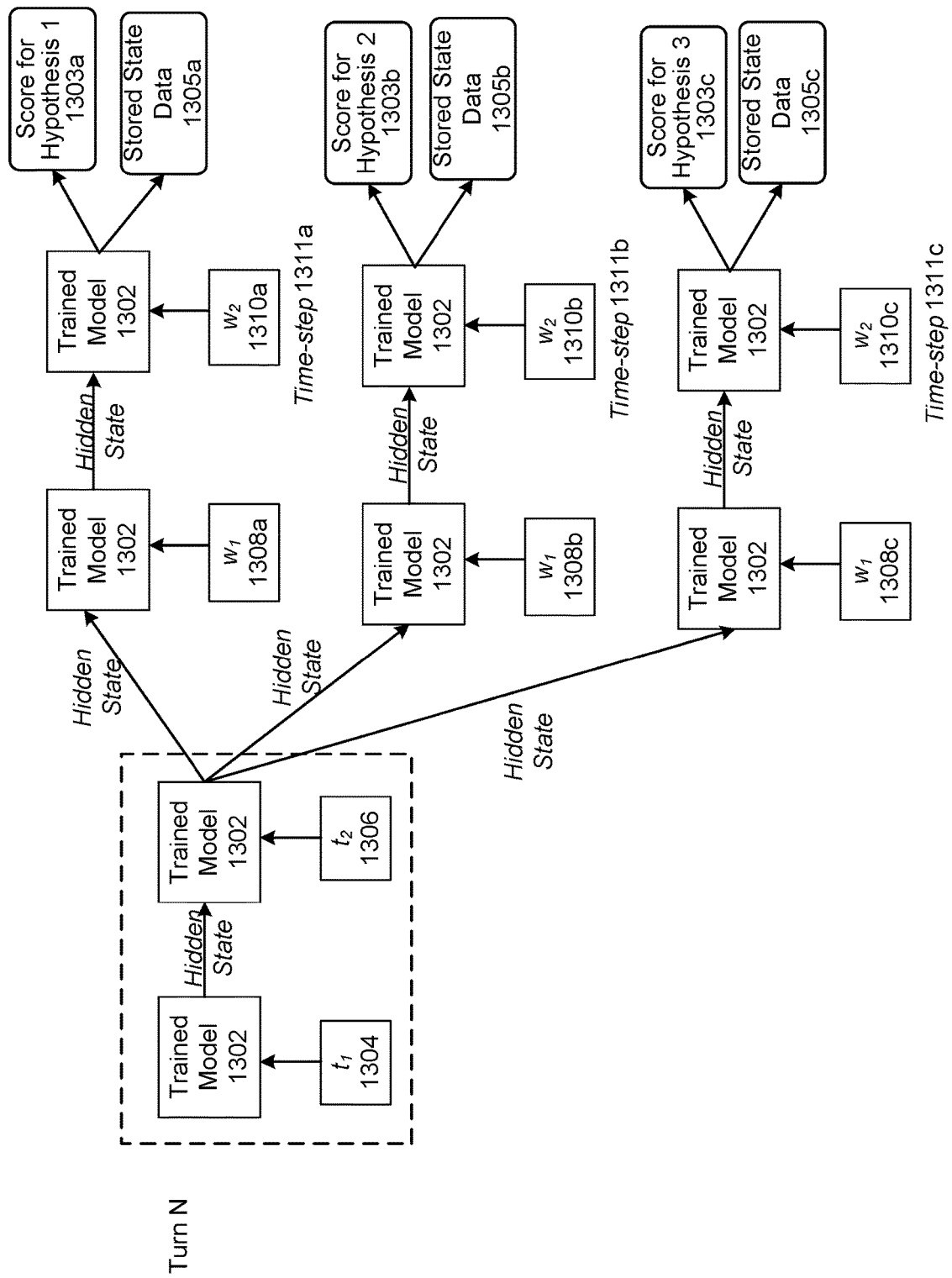

In another example embodiment, the dialog rescorer engine 259 employs a technique called long short-term memory (LSTM) encoder context to encode dialog session data. This technique may use LSTM blocks, which are particular forms of trained machine learned models. The LSTM encoder context technique is effective for maintaining long-term context and understanding complex sentences. In one embodiment of the LSTM encoder context, the user utterances and the system generated responses may be encoded using the same encoder. This method minimizes the number of weights of the trained model being shared, making it easier for the model to converge during training. The trained model (which in this technique may include an LSTM) is responsible both for predicting the next word and encoding long-term context. FIGS. 13A and 13B are block diagrams conceptually illustrating the LSTM encoder context technique using the same encoder to encode both the user utterances and the system generated responses, according to an example embodiment. The technique illustrated in FIGS. 13A and 13B may be performed by one or more components of the dialog rescorer engine 259. For example, the context encoder 950 may encode the input for each time-step of the trained model 1120 (referred to as trained model 1302 in FIGS. 13A and 13B) as described below. In FIGS. 13A and 13B, one word of the user utterance input is represented by $w_i$ where $w_1$ is the first word of a user utterance spoken at Turn N, $w_2$ is the second word of the user utterance spoken at Turn N, and so on. In an example embodiment, the user utterance input may be an ASR hypothesis for the user utterance. That is, $w_1$ may be the first word of a first hypothesis for the user utterance spoken at Turn N, $w_2$ may be the second word of the first hypothesis for the user utterance spoken at Turn N, and so on. One word of the system generated response is represented by $t_i$ where $t_1$ is the first word of a system generated response in a previous Turn N-1, $t_2$ is the second word of the system generated response in Turn N-1, and so on.

As illustrated in FIG. 13A, the dialog rescorer engine 259 rescores each hypothesis for the user utterance of Turn N by processing an individual word of each hypothesis using the trained model 1120. The trained model 1302 is an example of the trained model 1120 of the dialog rescorer engine 259. As illustrated in FIG. 13A, for one turn of a dialog session (e.g., Turn N) the input for the trained model 1302 at a first time-step is the first word of the system generated response in the previous Turn N-1 $t_1$ (1304). The context encoder 950 may encode tr (1304) to generate the input to the trained model 1302. At the second time-step, the input to the trained model 1302 is the second word of the system generated response in Turn N-1 $t_2$ (1306). The hidden state of the trained model 1302 after the first time-step may be used to initialize the trained model 1302 for the second time-step. These steps may continue until all the words in the system generated response for the previous Turn N-1 are processed.

After the system generated response for the Turn N-1 is processed, the hypotheses for the current user utterance for Turn N are processed. For example, the previous system generated response for Turn N-1 may include two words and the current user utterance for Turn N may include two words. At the third time-step, to process one hypothesis for the current user utterance, the hidden state of the trained model 1302 after the last time-step (e.g., second time-step) of processing the system generated response may be used to initialize the trained model 1302 for the third time-step. In this manner, the context information from the previous turn (Turn N−1) in the dialog session is considered in the form of the system generated response for the previous turn when rescoring the user utterance of the instant turn (Turn N). For the third time-step, the input to the trained model 1302 includes $w_1$ (1308) encoded by the context encoder 950. At the fourth time-step, the hidden state of the trained model 1302 after the third time-step is processed may be to initialize the trained model 1302 for the fourth time-step. For the fourth time-step, the input to the trained model 1302 includes $w_2$ (1310) encoded by the context encoder 950. These steps may continue until all the words in the hypothesis for the current user utterance for Turn N are processed, for example till Time-step 1311, to generate a new or updated score 1303 for the hypothesis. The hidden state of the trained model 1302 after the last time-step may be stored (1305) to initialize the trained model 1302 for the next turn (e.g., Turn N+1 illustrated in FIG. 13B).

As illustrated in FIG. 13A, each hypothesis in the ASR N-best list 1110 is processed to rescore the hypothesis. That is, $w_1$ (1308a), $w_2$ (1310a) correspond to a word of a first hypothesis for the current user utterance at Turn N generated by the ASR engine 258, and the exemplary third and fourth time-steps process the first hypothesis (word by word) of the ASR N-best list 1110 to generate a new score or updated score 1303a for the first hypothesis based on the system generated response at the previous Turn N−1. After the last time-step (e.g., time-step 1311), the hidden state of the trained model 1302a is stored (1305a) for later use.

In an example embodiment, the dialog rescorer engine 259 then may similarly process a second hypothesis of the ASR N-best list 1110 to generate a new score or updated score for the second hypothesis based on the system generated response at the previous Turn N−1. For processing the second hypothesis, for example, the $w_1$ (1308b), $w_2$ (1310b) correspond to a word of the second hypothesis for the current user utterance generated by the ASR engine 258. The hidden state of the trained model 1302 after processing the system generated response $t_1$ (1304), $t_2$ (1306) for previous Turn N−1 may be stored and used to initialize the trained model for processing the second hypothesis for the user utterance. A new or updated score 1303b may be generated for the second hypothesis. The hidden state of the trained model 1302 may be stored (1305b) for later use. The dialog rescorer engine 259 may process each hypothesis of the ASR N-best list 1110 in this manner to generate a new or updated score for each hypothesis. The new or updated score (1303) for each hypothesis and the hidden state (1305) for the corresponding trained model may be stored in memory.

Although FIG. 13A illustrates three hypotheses, it should be understood that the process in FIG. 13A can be used to process fewer or more than three hypotheses. Also, each hypothesis may have a different number of words. For example, one hypothesis may have three words, another hypothesis may have two words, and so forth.

To continue use of the dialog context for analyzing the user utterance in the next turn (e.g., Turn N+1) of the dialog session, the dialog rescorer engine 259 may select the best hypothesis based on the new or updated scores generated for the user utterance of Turn N. For example, for Turn N the dialog rescorer engine 259 may have processed three hypotheses as described above in relation to FIG. 13A, the new or updated scores (1303a, 1303b, 1303c) may be stored along with the hidden state (1305a, 1305b, 1305c) of the trained model 1302 after processing of the last time-step (e.g., Time-step 1311a, 1311b, 1311c). The dialog rescore engine 259 may determine that the first hypothesis 1303a, for example, has the best score, and may select the hidden state 1305a of the corresponding trained model for analyzing the next user utterance (e.g., spoken at Turn N+1) in the dialog session.

In an example embodiment, the new or updated scores for the hypothesis may be determined by combining the score for the hypothesis from the ASR N-best list 1110 with the score outputted by the dialog rescorer engine 259.

FIG. 13B illustrates processing of a user utterance spoken at the next turn. To continue use of the dialog context for the next turn (e.g., Turn N+1) of the dialog session, the hidden state 1305 of the trained model 1302 after the user utterance of Turn N is processed (e.g., after Time-step 1311) may be used to initialize the trained model 1302 for the first time-step for Turn N+1. In an example embodiment, the 'best' output of the trained model 1302 after all the hypotheses for the user utterance of Turn N is processed may be provided as input to the trained model 1302 for the first time-step for Turn N+1. The next turn (Turn N+1) is processed based on a different user utterance and the system generated response at the previous turn (Turn N). As illustrated in FIG. 13B, for the Turn N+1 of the dialog session the input for the trained model 1302 at a first time-step is the first word of the system generated response at Turn N $t_1$ (1313). The context encoder 950 may encode $t_2$ (1312) to generate the input to the trained model 1302. At the second time-step, the input to the trained model 1302 is the second word of the system generated response at Turn N $t_2$ (1314). The hidden state of the trained model 1302 after the first time-step is processed may be used to initialize the trained model for the second time-step. These steps may continue until all the words in the system generated response at Turn N are processed.

After the system generated response at Turn N is processed, the hypotheses for the current user utterance spoken at Turn N+1 are processed. For example, the system generated response for Turn N may include two words and the user utterance spoken at Turn N+1 may include two words. At the third time-step, to process a hypothesis for the current user utterance, the hidden state of the trained model 1302 after the second time-step is processed may be used to initialize the trained model for the third time-step. In this manner, the context information from the previous turn (Turn N) in the dialog session is considered in the form of the system generated response for the previous turn when rescoring the user utterance of the instant turn (Turn N+1). At the fourth time-step, the hidden state of the trained model 1302 after the third time-step is processed may be used to initialize the trained model for the fourth time-step. For the fourth time-step, the input to the trained model 1302 includes $w_2$ (1318). These steps may continue until all the words in the hypothesis for the current user utterance for Turn N+1 are processed to generate a new or updated score for the hypothesis.

In an example embodiment, the dialog rescorer engine 259 then may similarly process the other hypotheses of the ASR N-best list 1110 for the user utterance spoken at Turn N+1 to generate a new score or updated score based on the system generated response at the previous Turn N. The hidden states of the trained model after the last time-step is processed may be stored (1320) for later use.

In an example embodiment, the trained model 1302 for Turn N+1 may include an attention mechanism to weight the internal states of the trained models after all the hypotheses for Turn N are processed. Using the attention mechanism, the past hidden states of the previous turn may be embedded and considered when processing future turns in the dialog.

In an example embodiment, the metadata 1116 may be encoded by the context encoder 950 with the particular input at each time-step. For example, the context encoder 950 may concatenate the metadata 1116 with $t_1$ (1304) at the first time-step of Turn N and may concatenate the metadata 1116 with $t_2$ (1306) at the second time-step of Turn N.

Figure 14A:
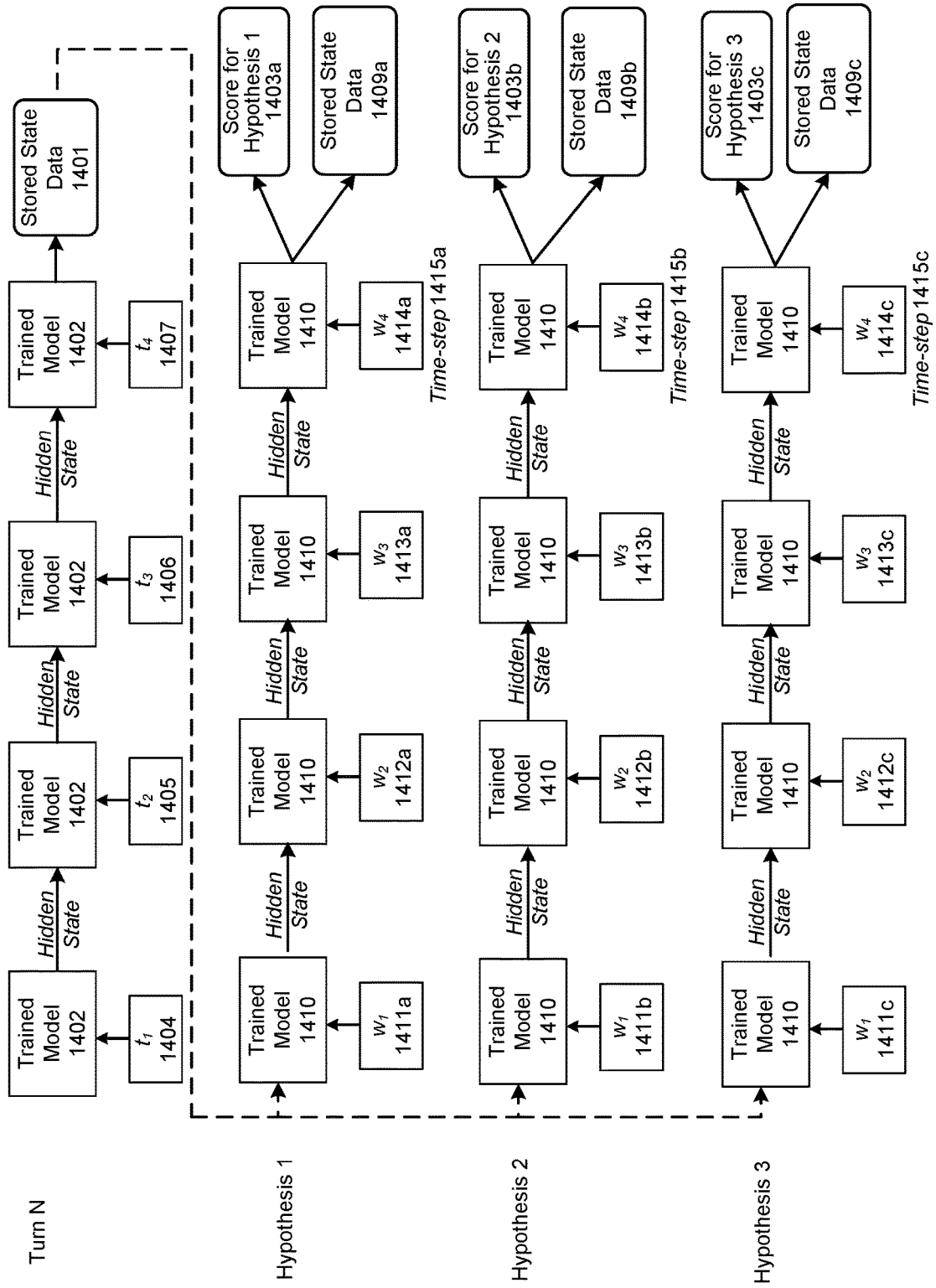
FIGS. 14A and 14B are block diagrams conceptually illustrating the LSTM encoder context technique using different encoders to encode the user utterances and the system generated responses according to embodiments of the present disclosure.
Figure 14B:
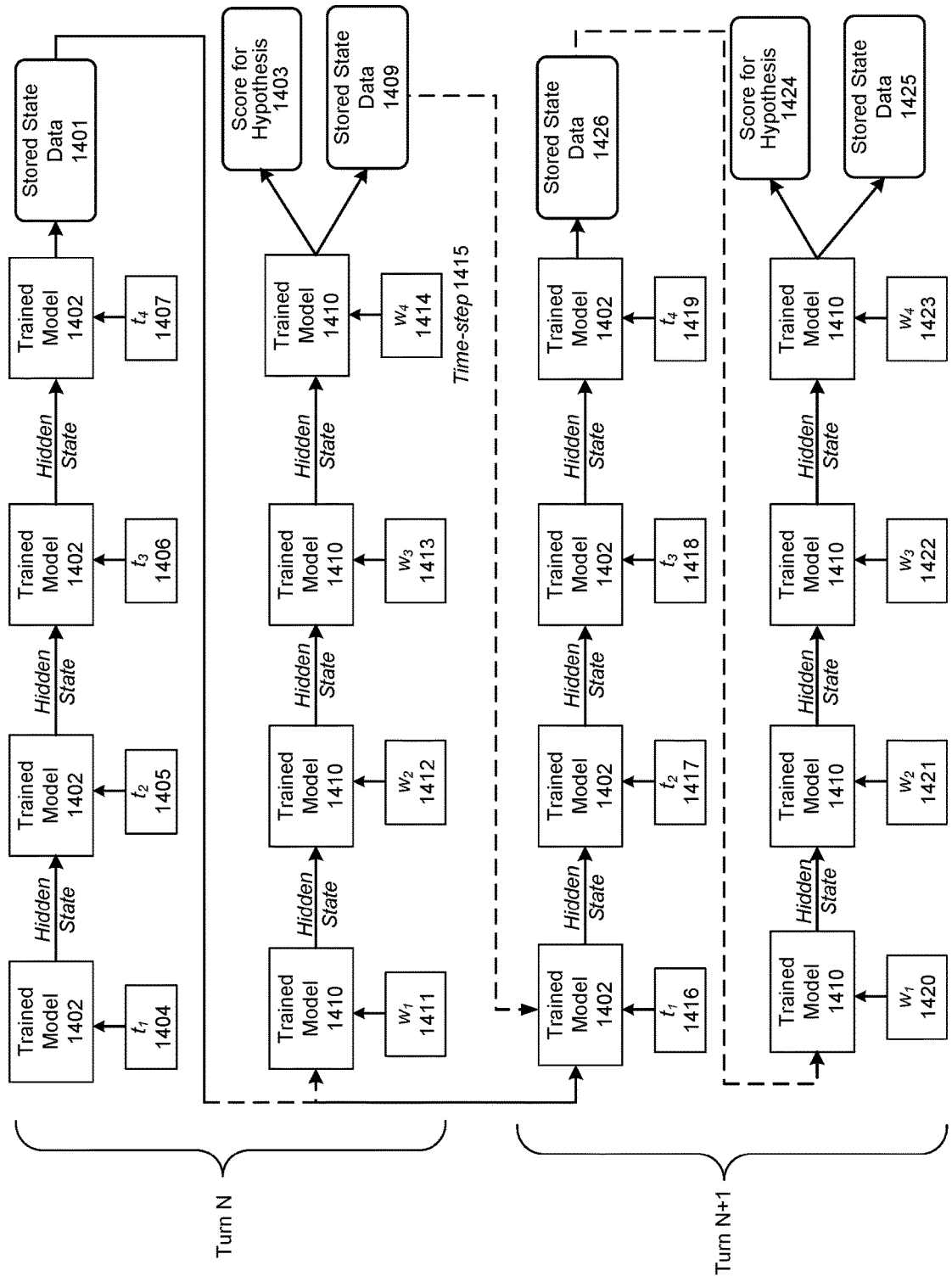

In another embodiment of the LSTM encoder context, the user utterances and the system generated responses may be encoded using separate encoders. FIGS. 14A and 14B are block diagrams conceptually illustrating the LSTM encoder context technique using different encoders to encode the user utterances and the system generated responses, according to an example embodiment. This technique is similar to an encoder-decoder architecture, where the hidden state of the trained model is initialized with the context data outputted by the context encoder 950. The technique illustrated in FIGS. 14A and 14B may be performed by one or more components of the dialog rescorer engine 259. For example, the context encoder 950 may encode the input (represented by past user utterance data 1112 and past system response data 1114) for each time-step of the trained model 1120 (referred to as trained models 1402, 1410 in FIGS. 14A and 14B) as described below. In FIGS. 14A and 14B, one word of the user utterance input is represented by $w_i$, where $w_1$ is the first word of the user utterance spoken at Turn N, $w_2$ is the second word of the user utterance spoken at Turn N, and so on. In an example embodiment, the user utterance input may be an ASR hypothesis for the user utterance. That is, $w_1$ may be the first word of a first hypothesis for the user utterance spoken at Turn N, $w_2$ may be the second word of the first hypothesis for the user utterance spoken at Turn N, and so on. One word of the system generated response in the previous Turn N−1 is represented by $t_i$, where $t_1$ is the first word of the system generated response at Turn N−1, $t_2$ is the second word of the system generated response at Turn N−1, and so on.

The trained model 1402 is an example of the trained model 1120 of the dialog rescorer engine 259. As illustrated in FIG. 14A, for one turn of a dialog session (e.g., Turn N) the input for the trained model 1402 at a first time-step is the first word of the system generated response in the previous Turn N−1 $t_1$ (1404). A first context encoder (e.g., context encoder 950*a*) may encode $t_1$ (1404) to generate the input to the trained model 1402. At the second time-step, the input to the trained model 1402 is the second word of the system generated response in the previous Turn N−1 $t_2$ (1405). The hidden state of the trained model 1402 after the first time-step is processed may be used to initialize the trained model for the next time-step. These steps may continue until all the words in the system generated response for Turn N−1 are processed using the first context encoder.

To use the dialog context information from Turn N, the hidden state of the trained model 1402 after all the words (e.g., 1404-1407) in the system generated response at Turn N−1 are processed may be stored (1401) and may be used to initialize the trained model 1402 for processing the next Turn N+1 (illustrated in FIG. 14B). Alternatively, as indicated by the dotted line in FIG. 14A, the stored state data 1401 may or may not be used to initialize the trained model 1410 depending on system configuration.

In certain embodiments, the current user utterance spoken at Turn N is processed using a separate or second context encoder (e.g., context encoder 950*b*). Thus, weights may not be shared between the system response encoder and the user utterance encoder. This allows the encoding of the system response to happen separately from the encoding of the user utterance. As illustrated in FIG. 14A, the dialog rescorer engine 259 rescores each hypothesis for the user utterance of Turn N by processing an individual word of each hypothesis using the trained model 1120. The trained model 1410 is an example of the trained model 1120 of the dialog rescorer engine 259. At the first time-step, the second context encoder encodes the first word of a hypothesis for the current user utterance spoken at Turn N $w_1$ (1411) to generate the input for the trained model 1410. For clarity, this encoding is not shown explicitly in FIG. 14A or 14B. At the second time-step, to process the current user utterance, the hidden state of the trained model 1410 after the first time-step is processed may be used to initialize the trained model for the second time-step. For the second time-step, the input to the trained model 1410 includes $w_2$ (1412). At the third time-step, the hidden state of the trained model 1410 after the second time-step is processed may be used to initialize the trained model for the third time-step. For the third time-step, the input to the trained model 1410 includes $w_3$ (1413). These steps may continue until all the words in the hypothesis for the user utterance for Turn N are processed using the second context encoder to generate a new or updated score 1403 for the hypothesis. The hidden state of the trained model 1410 after the last time-step may be stored (1409) to initialize the trained model 1402 for the next turn (e.g., Turn N+1 illustrated in FIG. 14B).

As illustrated in FIG. 14A, each hypothesis in the ASR N-best list 1110 is processed to rescore the hypotheses. That is, $w_1$ (1411*a*), $w_2$ (1412*a*), $w_3$ (1413*a*), $w_4$ (1414*a*) correspond to a word of a first hypothesis for the current user utterance at Turn N generated by the ASR engine 258, and the exemplary first through fourth time-steps process the first hypothesis (word by word) of the ASR N-best list 1110 to generate a new score or updated score 1403*a* for the first hypothesis based on the system generated response at the previous Turn N−1. After the last time-step (e.g., time-step 1415), the hidden state of the trained model 1410 may be stored (1409*a*) for later use.

In an example embodiment, the dialog rescorer engine 259 then may similarly process a second hypothesis of the ASR N-best list 1110 to generate a new score or updated score 1403*b* for the second hypothesis based on the system generated response at the previous Turn N−1. For processing the second hypothesis, for example, the $w_1$ (1411*b*), $w_2$ (1412*b*), $w_3$ (1413*b*), $w_4$ (1414*b*) correspond to a word of the second hypothesis for the current user utterance generated by the ASR engine 258, and the exemplary first through fourth time-steps process the second hypothesis (word by word) of the ASR N-best list 1110. The dialog rescorer engine 259 may process each hypothesis of the ASR N-best list 1110 in this manner to generate a new or updated score for each hypothesis. The new or updated score (1403*b*) for each hypothesis and the hidden state (1405*b*) for the corresponding trained model may be stored in memory.

Although FIG. 14A illustrates three hypotheses, it should be understood that the process in FIG. 14A can be used to process fewer or more than three hypotheses. Also, each hypothesis may have a different number of words. For example, one hypothesis may have three words, another hypothesis may have two words, and so forth.

To continue use of the dialog context for analyzing the user utterance in the next turn (e.g., Turn N+1) of the dialog session, the dialog rescorer engine 259 may select the best hypothesis based on the new or updated scores generated for the user utterance of Turn N. For example, for Turn N the dialog rescorer engine 259 may have processed three hypotheses as described above in relation with FIG. 14A, and the hidden state (1409*a*, 1409*b*, 1409*c*) of the trained model 1410 after processing of the last time-step (e.g., Time-step 1414) may be stored as the new or updated score for the hypotheses. The dialog rescorer engine 259 may determine that the third hypothesis, for example, has the best score 1403*c*, and may select the hidden state 1405*c* of the corresponding trained model for analyzing the next user utterance (e.g., spoken at Turn N+1) in the dialog session.

In an example embodiment, the new or updated scores for the hypothesis may be determined by combining the score for the hypothesis from the ASR N-best list 1110 with the score outputted by the dialog rescorer engine 259.

FIG. 14B illustrates processing of a user utterance spoken at the next turn. To continue use of the dialog context for the next turn (e.g., Turn N+1) of the dialog session, the hidden state (1401) of the trained model 1402 after all words in the system generated response for Turn N−1 (e.g., 1404-1407) are processed is used to initialize the trained model 1402 for the first time-step of Turn N+1. In an example embodiment, the stored hidden state (1409) after processing the user utterance spoken at Turn N may be used to initialize the trained model 1402 for Turn N+1. In another embodiment, the stored hidden state 1401 and the stored hidden state 1409 may be combined or used in combination to initialize the trained model 1402 for Turn N+1. The next turn (Turn N+1) is processed based on a different user utterance and the system generated response at the previous turn (Turn N). As illustrated in FIG. 14B, for the next turn of the dialog session the input for the trained model 1402 at a first time-step is the first word of the system generated response in Turn N $t_1$ (1416). A first context encoder (e.g., context encoder 950*a*) may encode $t_1$ (1416) to generate the input to the trained model 1402. At the second time-step, the input to the trained model 1402 is the second word of the system generated response in Turn N $t_2$ (1417). These steps may continue until all the words in the system generated response in Turn N are processed using the first context encoder. The hidden state of the trained model 1402 after the system generated response is processed may be stored (1401) for later use.

As described in connection with FIG. 14A, in this embodiment, the user utterances spoken are processed using a separate or second context encoder. To use the dialog context information from the system generated response in Turn N, the hidden state (1401) of the trained model 1402 after all the words (e.g., 1416-1419) in the system generated response in Turn N are processed may be stored (1426) and used to initialize the trained model 1410 for processing the current user utterance spoken at Turn N+1. Alternatively, as indicated by the dotted line in FIG. 14B, the stored state data 1426 may or may not be used to initialize the trained model 1410 depending on system configuration. At the first time-step, the second context encoder encodes the first word of a hypothesis of the current user utterance spoken at Turn N+1 $w_1$ (1420) to generate the input for the trained model 1410. As indicated by the dotted line in FIG. 14B from 1401 to 1410, the stored state data 1401 may or may not be used to initialize the trained model 1410 depending on system configuration. At the second time-step, to process the current user utterance, the hidden state of the trained model 1410 after the first time-step is processed may be used to initialize the trained model for the second time-step. For the second time-step, the input to the trained model 1410 includes $w_2$ (1412). At the third time-step, the hidden state of the trained model 1410 after the second time-step is processed may be used to initialize the trained model for the third time-step. For the third time-step, the input to the trained model 1410 includes $w_3$ (1413). These steps may continue until all the words in the hypothesis for the current user utterance spoken at Turn N+1 are processed using the second context encoder to generate a new or updated score (1424) for the hypothesis. The hidden state (1425) of the trained model after all the time-steps are processed may be stored for later use.

In an example embodiment, the dialog rescorer engine 259 then may similarly process the other hypotheses of the ASR N-best list 1110 for the user utterance spoken at Turn N+1 to generate a new score or updated score based on the system generated response at the previous Turn N. The hidden states of the trained model after the last time-step is processed may be stored (1425) for later use.

In an example embodiment, the trained model 1410 for Turn N+1 may include an attention mechanism to weight the internal states of the trained models after all the hypotheses for Turn N are processed. Using the attention mechanism, the past hidden states of the previous turn may be embedded and considered when processing future turns in the dialog.

In an example embodiment, the metadata 1116 may be encoded by the context encoder 950 with the particular input at each time-step. For example, the context encoder 950 may concatenate the metadata 1116 with and $t_1$ (1404) at the first time-step of Turn N and may concatenate the metadata 1116 with $t_2$ (1405) at the second time-step of Turn N.

The steps described in connection with FIGS. 12A and B, 13A and B and 14A and B are an example of processing the first data, the second data and a portion of the language model output data to rescore the ASR hypotheses (138 of FIG. 1). For example, data corresponding to a first utterance (130 of FIG. 1) may be data representing the current user utterance spoken at Turn N+1 in FIGS. 12, 13, and 14. The first data (134 of FIG. 1) may be data corresponding to the previous user utterance spoken at Turn N in FIGS. 12, 13 and 14. The second data (136 of FIG. 1) may be data corresponding to the system generated response to the previous utterance in Turn N in FIGS. 12, 13, and 14.

In an example embodiment, a caching mechanism is utilized. A cache pointer may be formulated as an interpolation of the probabilities outputted by the trained model, and a key-value attention with the keys being past hidden states and the values being past words. The cache pointer may model the high likelihood that the user will repeat words they previously spoke.

Figure 15:
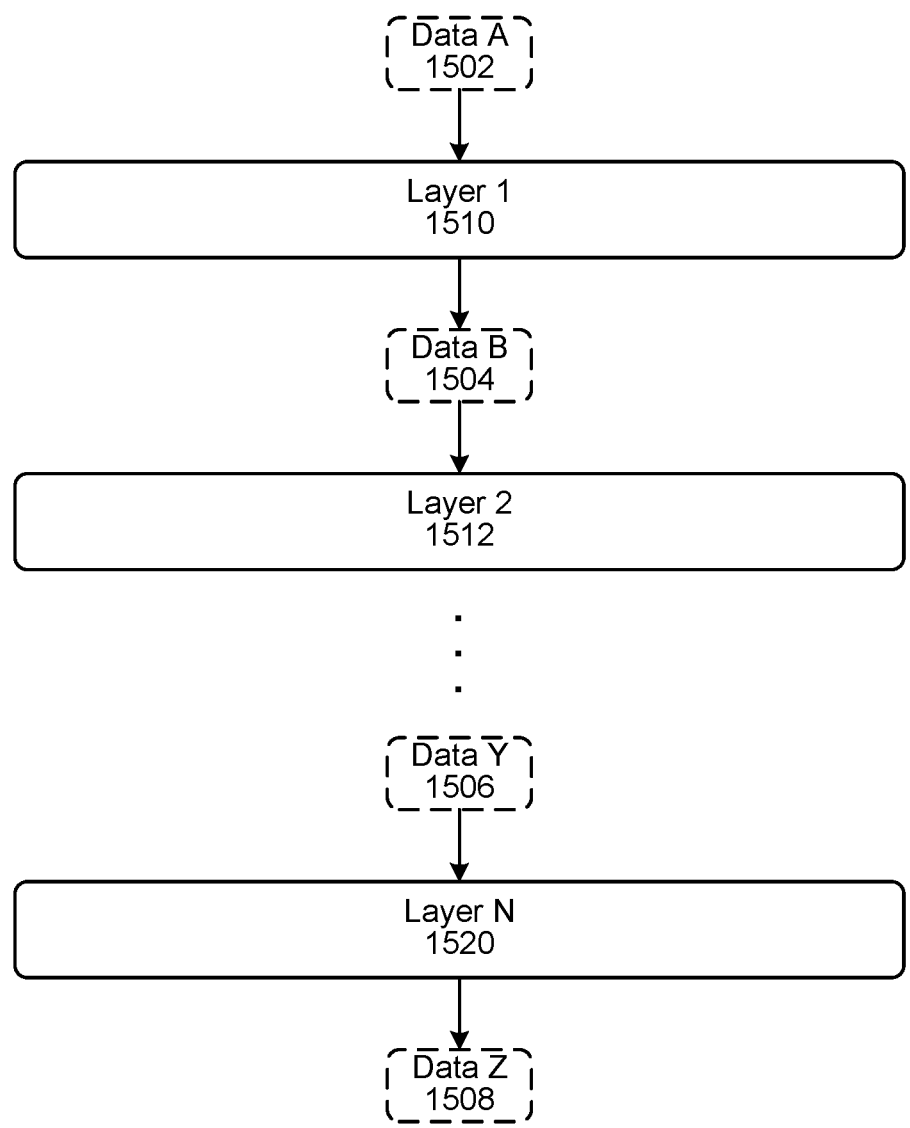
FIG. 15 is a conceptual diagram illustrating layers of a trained model according to embodiments of the present disclosure.

A trained model 1120 for the dialog rescorer engine 259 may take many forms, including a neural network. As illustrated in FIG. 15, a neural network may include a number of layers, from input layer 1 1510 through output layer N 1520. Each layer is configured to output a particular type of data and output another type of data. The neural network illustrated in FIG. 15 is configured to input data of type data A 1502 (which is the input to layer 1 1510) and output data of type data Z 1508 (which is the output from the last layer N 1520). The output from one layer is then taken as the input to the next layer. For example, the output data (data B 1504) from layer 1 1510 is the input data for layer 2 1512 and so forth such that the input to layer N 1520 is data Y 1506 output from the penultimate layer (not shown).

While values for the input data/output data of a particular layer are not known until a neural network is actually operating during runtime, the data describing the neural network describes the structure and operations of the layers of the neural network.

Figure 16:
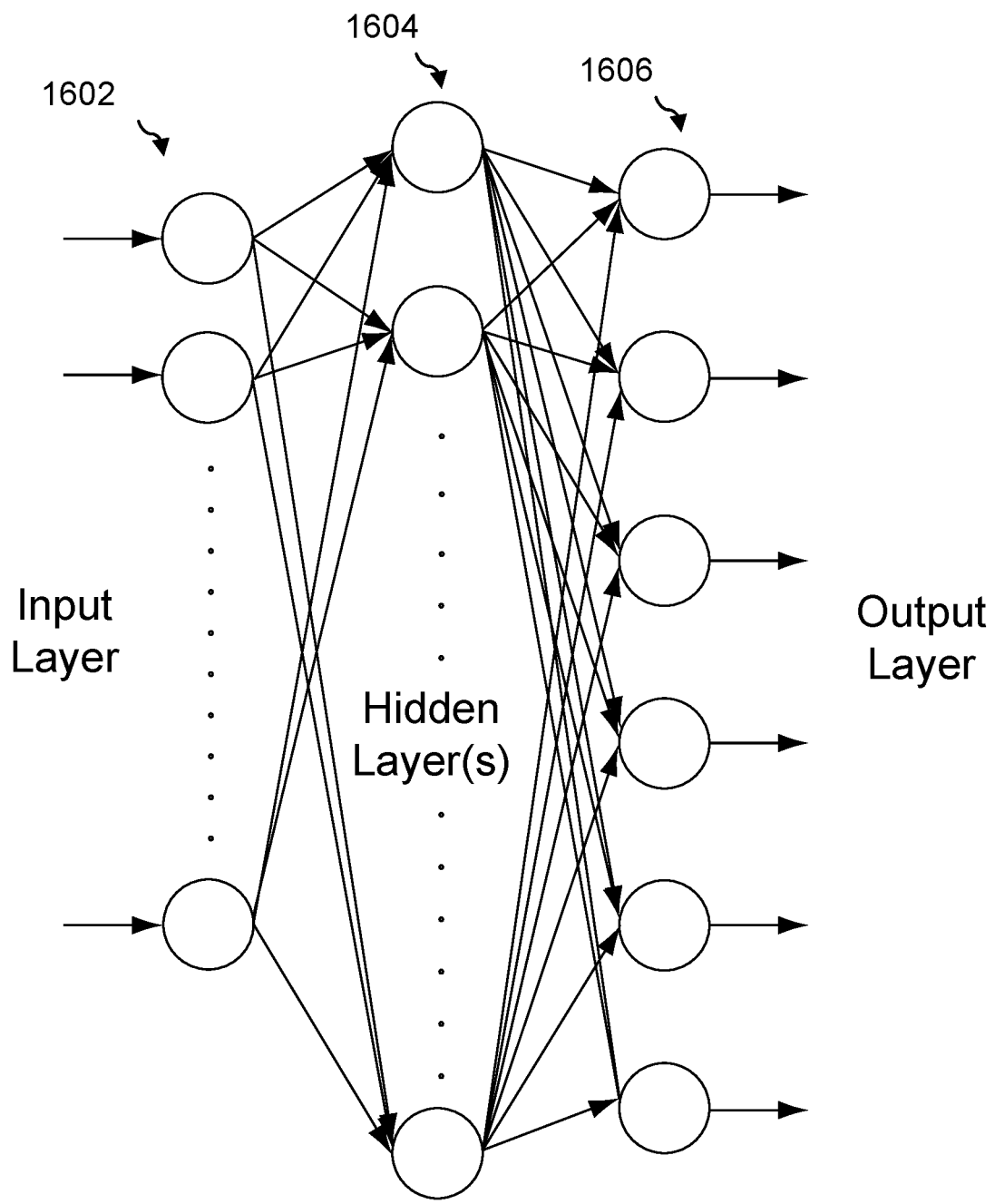
FIG. 16 illustrates a neural network for speech recognition according to embodiments of the present disclosure.

An example neural network for an ASR rescorer engine is illustrated in FIG. 16. A neural network may be structured with an input layer 1602, middle layer(s) 1604, and an output layer 1606. The middle layer(s) may also be known as the hidden layer(s). Each node of the hidden layer is connected to each node in the input layer and each node in the output layer. In an example embodiment, the hidden layer may be initialized using the data generated by the context encoder 950. Although illustrated in FIG. 16 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 17:
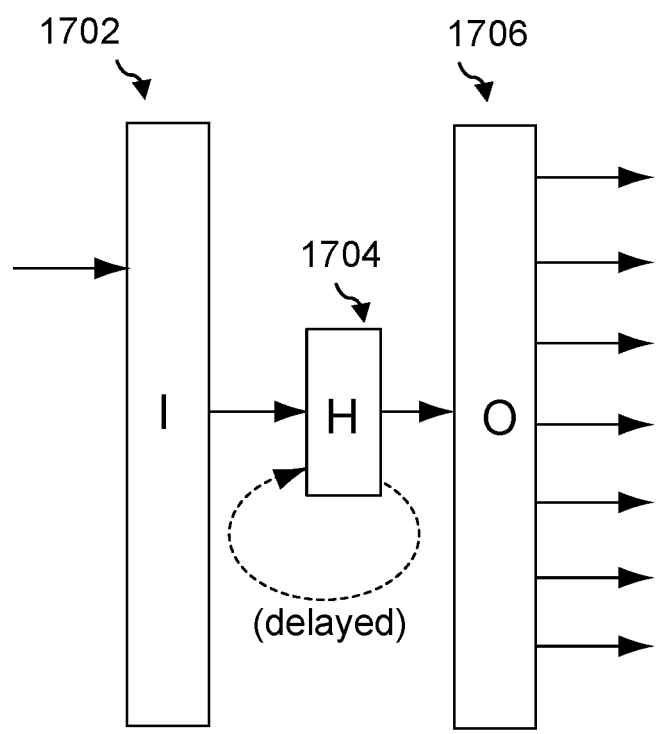
FIG. 17 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 17. Each node of the input layer 1702 connects to each node of the hidden layer 1704. Each node of the hidden layer 1704 connects to each node of the output layer 1706. As illustrated, the output of the hidden layer 1704 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 17, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 18:
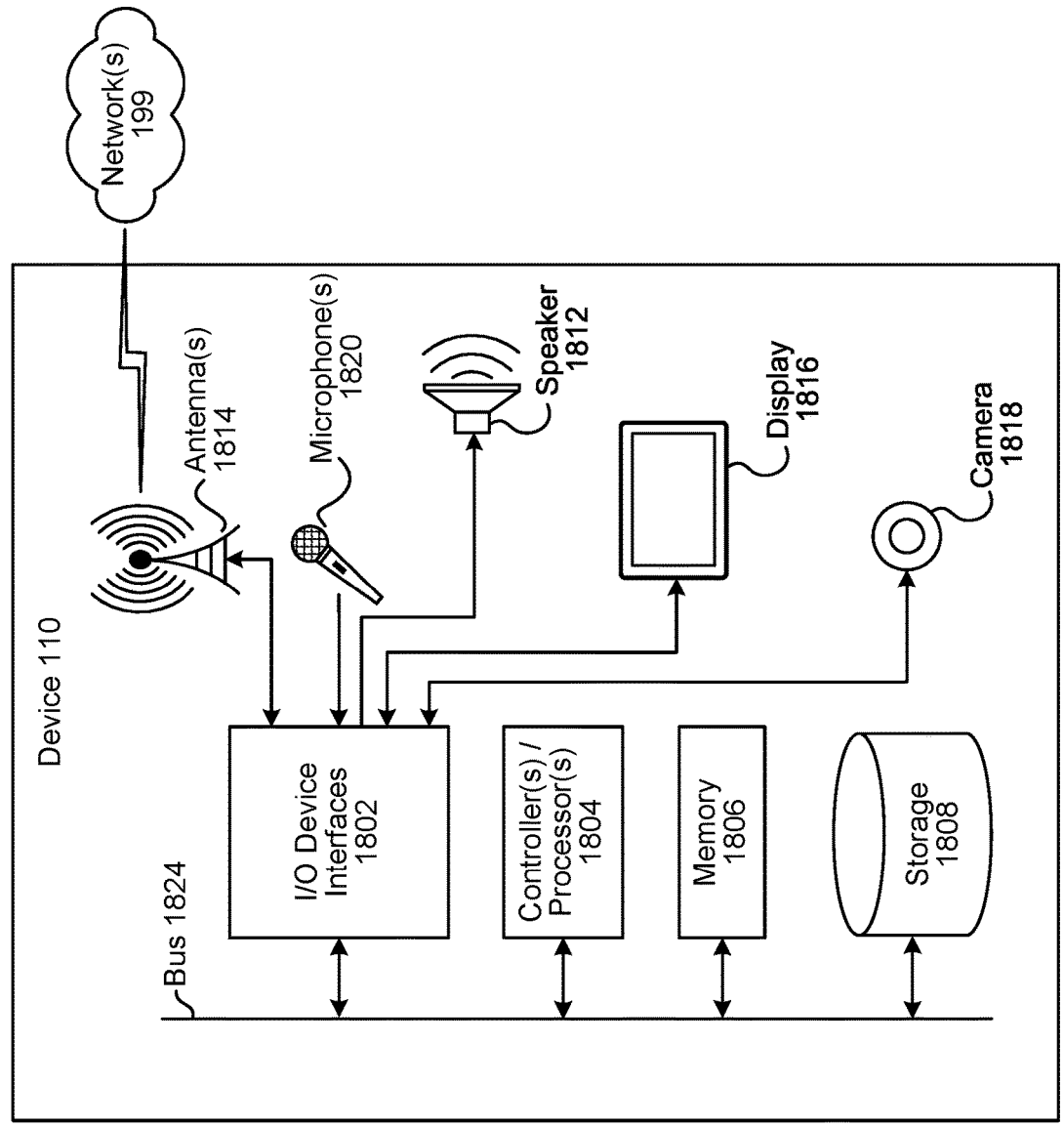
FIG. 18 is a block diagram conceptually illustrating example components of a device according to embodiments of the present disclosure.
Figure 19:
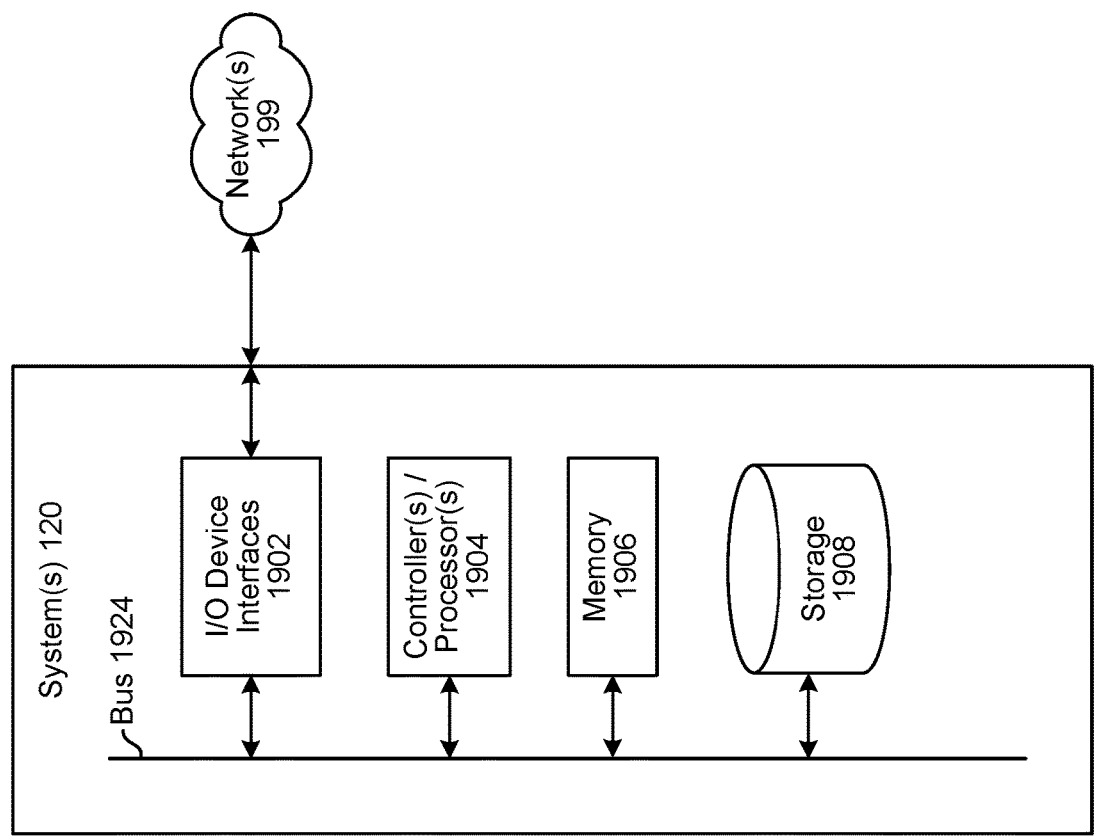
FIG. 19 is a block diagram conceptually illustrating example components of a server according to embodiments of the present disclosure.

FIG. 18 is a block diagram conceptually illustrating a device 110 that may be used with the system. FIG. 19 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive memory (MRAM), and/or other types of memory. Each device (110/120/225) may also include a data storage component (1808/1908) for storing data and controller/processor-executable instructions. Each data storage component (1808/1908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1802/1902).

Computer instructions for operating each device (110/120/225) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/120/225) includes input/output device interfaces (1802/1902). A variety of components may be connected through the input/output device interfaces (1802/1902), as will be discussed further below. Additionally, each device (110/120/225) may include an address/data bus (1824/1924) for conveying data among components of the respective device. Each component within a device (110/120/225) may also be directly connected to other components in addition to (or instead of) being connected to other components across the bus (1824/1924).

Referring to FIG. 18, the device 110 may include input/output device interfaces 1802 that connect to a variety of components such as an audio output component such as a speaker 1812, a wired headset or a wireless headset (not illustrated), or other component capable of outputting audio. The device 110 may also include an audio capture component. The audio capture component may be, for example, a microphone 1820 or array of microphones 1820, a wired headset or a wireless headset (not illustrated), etc. If an array of microphones 1820 is included, approximate distance to a sound's point of origin may be determined by acoustic localization based on time and amplitude differences between sounds captured by different microphones of the array. The device 110 may additionally include a display 1816 for displaying content. The device 110 may further include a camera 1818.

Via antenna(s) 1814, the I/O device interfaces 1802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1802/1902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1802/1902), processor(s) (1804/1904), memory (1806/1906), and/or storage (1808/1908) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor (s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 20:
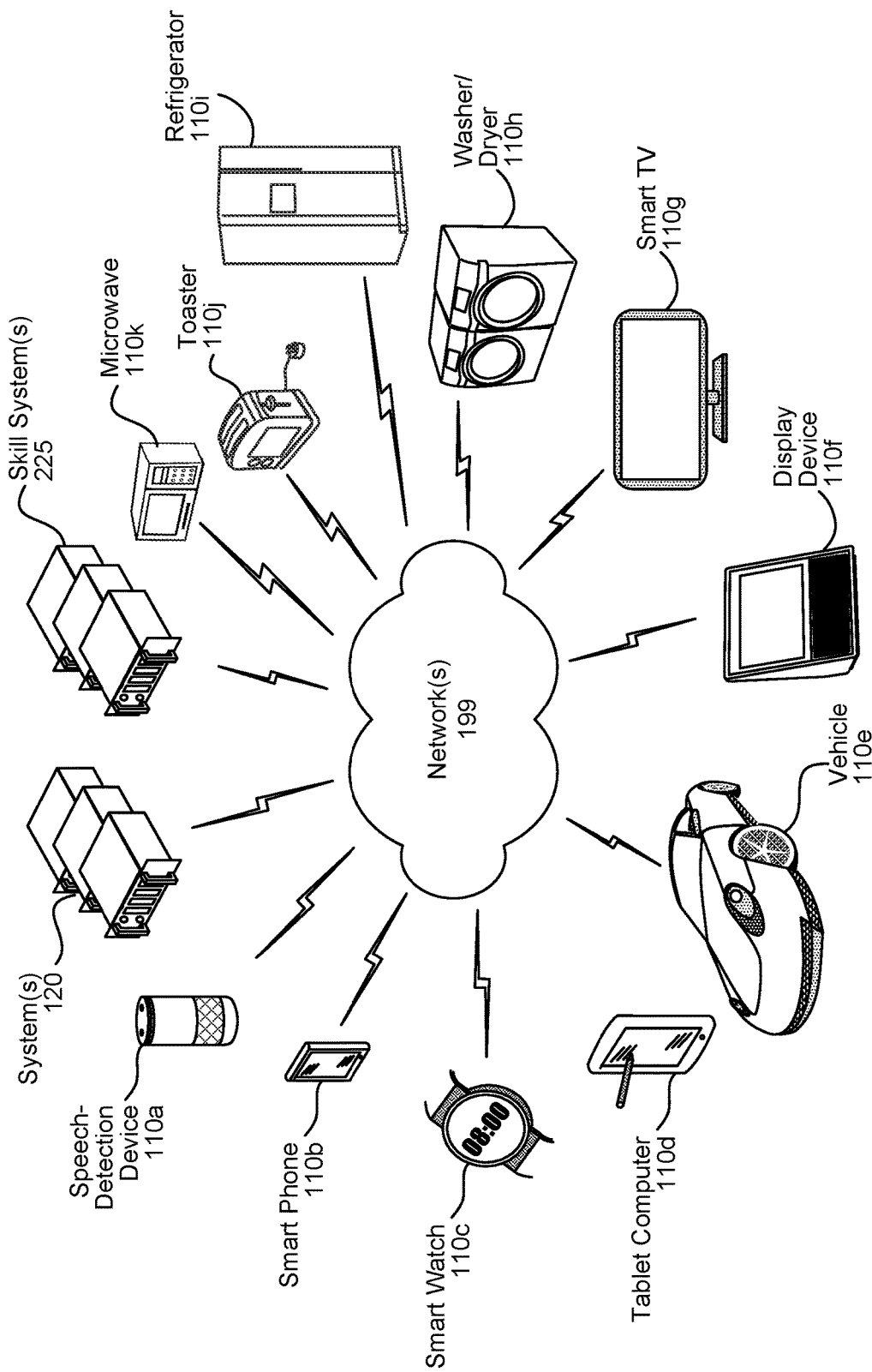
FIG. 20 illustrates an example of a computer network for use with the speech processing system.

As illustrated in FIG. 20, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system (s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving input audio data corresponding to a first utterance;
   performing speech recognition using the input audio data to determine first data indicating at a least a first speech recognition hypothesis representing the first utterance;
   encoding the first data to generate first encoded data;
   receiving second encoded data corresponding to a past utterance;
   processing the first encoded data and the second encoded data using a machine learning model to determine model output data indicating a second speech recognition hypothesis as representing the first utterance, the second speech recognition hypothesis being different from the first speech recognition hypothesis;
   processing the second speech recognition hypothesis to generate second data indicating an action to be performed in response to the first utterance; and
   generating, using the second data, output data responsive to the first utterance.

2. The computer-implemented method of claim 1, further comprising:
   receiving third data corresponding to the past utterance; and
   encoding the third data to generate the second encoded data.

3. The computer-implemented method of claim 2, further comprising:
   determining fourth data representing content of a user input corresponding to the past utterance; and
   including the fourth data in the third data.

4. The computer-implemented method of claim 2, further comprising:
   determining fourth data representing content of a system response to the past utterance; and
   including the fourth data in the third data.

5. The computer-implemented method of claim 1, further comprising:
   determining third encoded data representing parts-of-speech of at least one of the first utterance or the past utterance,
   wherein the machine learning model further processes the third encoded data to determine the model output data.

6. The computer-implemented method of claim 1, further comprising:
   determining third encoded data representing a device corresponding to the first utterance,
   wherein the machine learning model further processes the third encoded data to determine the model output data.

7. The computer-implemented method of claim 1, further comprising:
   determining weight data based at least in part on the second encoded data,
   wherein the machine learning model uses the weight data to determine the model output data.

8. The computer-implemented method of claim 1, further comprising:
   determining third encoded data representing a topic of at least one of the first utterance or the past utterance,
   wherein the machine learning model further processes the third encoded data to determine the model output data.

9. The computer-implemented method of claim 1, wherein the first data represents a plurality of speech recognition hypotheses.

10. A system comprising:
    at least one processor; and
    at least one memory comprising instructions that, when executed by the at least one processor, cause the system to:
    receive input audio data corresponding to a first utterance;
    perform speech recognition using the input audio data to determine first data indicating at a least a first speech recognition hypothesis representing the first utterance;
    encode the first data to generate first encoded data;
    receive second encoded data corresponding to a past utterance;
    process the first encoded data and the second encoded data using a machine learning model to determine model output data indicating a second speech recognition hypothesis representing the first utterance, the second speech recognition hypothesis being different from the first speech recognition hypothesis;
    process the second speech recognition hypothesis to generate second data indicating an action to be performed in response to the first utterance; and
    generate, using the second data, output data responsive to the first utterance.

11. The system of claim 10, wherein the at least one memory further comprises instructions that, when executed by the at least one processor, further cause the system to:
    receive third data corresponding to the past utterance; and
    encode the third data to generate the second encoded data.

12. The system of claim 11, wherein the at least one memory further comprises instructions that, when executed by the at least one processor, further cause the system to:
    determine fourth data representing content of a user input corresponding to the past utterance; and
    include the fourth data in the third data.

13. The system of claim 11, wherein the at least one memory further comprises instructions that, when executed by the at least one processor, further cause the system to:
    determine fourth data representing content of a system response to the past utterance; and
    include the fourth data in the third data.

14. The system of claim 10, wherein the at least one memory further comprises instructions that, when executed by the at least one processor, further cause the system to:
    determine third encoded data representing parts-of-speech of at least one of the first utterance or the past utterance,
    wherein the machine learning model further processes the third encoded data to determine the model output data.

15. The system of claim 10, wherein the at least one memory further comprises instructions that, when executed by the at least one processor, further cause the system to:
    determine third encoded data representing a device corresponding to the first utterance,
    wherein the machine learning model further processes the third encoded data to determine the model output data.

16. The system of claim 10, wherein the at least one memory further comprises instructions that, when executed by the at least one processor, further cause the system to:
    determine weight data based at least in part on the second encoded data,
    wherein the machine learning model uses the weight data to determine the model output data.

17. The system of claim 10, wherein the at least one memory further comprises instructions that, when executed by the at least one processor, further cause the system to:
    determine third encoded data representing a topic of at least one of the first utterance or the past utterance,
    wherein the machine learning model further processes the third encoded data to determine the model output data.

18. The system of claim 10, wherein the first data represents a plurality of speech recognition hypotheses.

\* \* \* \* \*